United States Patent [19]

Nishioka et al.

[11] Patent Number: 4,867,546
[45] Date of Patent: Sep. 19, 1989

[54] OBJECTIVE LENS SYSTEM FOR AN ENDOSCOPE

[75] Inventors: Kimihiko Nishioka, Tokyo; Kikumi Tojo, Kanagawa; Akira Yokota, Tokyo, all of Japan

[73] Assignee: Olympus Optical Co., Ltd., Tokyo, Japan

[21] Appl. No.: 170,703

[22] Filed: Mar. 14, 1988

Related U.S. Application Data

[63] Continuation of Ser. No. 816,869, Jan. 7, 1986.

[30] Foreign Application Priority Data

Jan. 11, 1985 [JP] Japan .................................. 60-2064

[51] Int. Cl.$^4$ .............................................. G02B 13/18
[52] U.S. Cl. ................................................... 350/432
[58] Field of Search .......................................... 350/432

[56] References Cited

U.S. PATENT DOCUMENTS

| 4,153,339 | 5/1979 | Tajima et al. | 350/432 |
| 4,331,391 | 5/1982 | Baker | 350/432 |
| 4,403,837 | 9/1983 | Nakahashi . | |
| 4,606,607 | 8/1986 | Kurihara | 350/432 |

FOREIGN PATENT DOCUMENTS 2748516 7/1978 Fed. Rep. of Germany .
3214544 11/1982 Fed. Rep. of Germany .
49-121547 11/1974 Japan .
57-173810 10/1982 Japan .

Primary Examiner—Bruce Y. Arnold
Assistant Examiner—Rebecca D. Gass
Attorney, Agent, or Firm—Cushman, Darby & Cushman

[57] ABSTRACT

An objective lens system for an endoscope comprising a front lens unit, a stop, and a rear lens unit wherein the front lens unit comprises a lens component arranged that the surface on the object side thereof is formed as an aspherical surface having portions whose curvature is made gradually stronger as they are farther from the optical axis or a lens component arranged that the surface on the image side thereof is formed as an aspherical surface having portions whose curvature is made gradually weaker as they are farther from the optical axis, and the rear lens unit comprises a lens component arranged that the surface on the image side thereof is formed as an aspherical surface having portions whose curvature is made gradually stronger as they are farther from the optical axis or a lens component arranged that the surface on the object side thereof is formed as an aspherical surface having portions whose curvature is made gradually weaker as they are farther from the optical axis, the objective lens system for an endoscope being arranged that distortion and curvature of field are corrected favorably.

70 Claims, 16 Drawing Sheets

FIG. 1 PRIOR ART
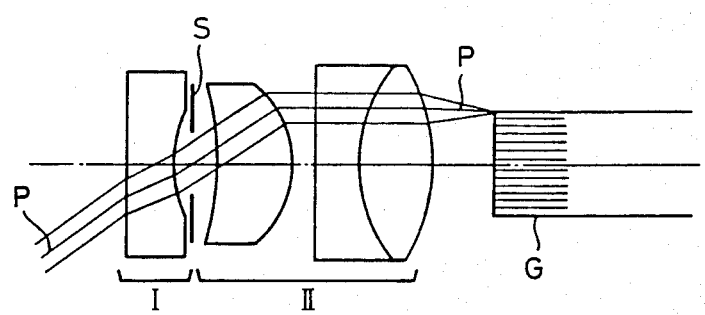
FIG. 2 PRIOR ART
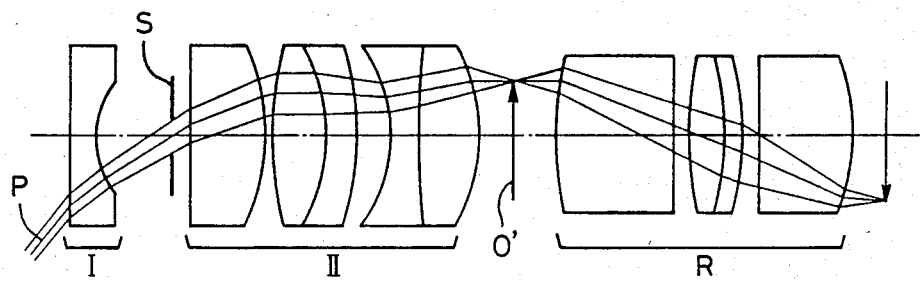
FIG. 3   FIG. 4   FIG. 5
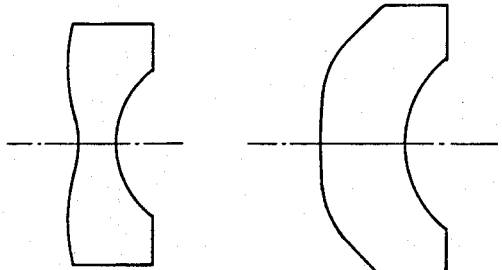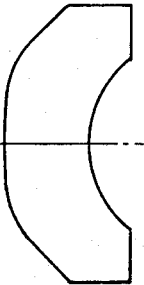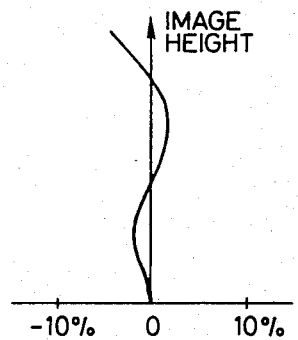

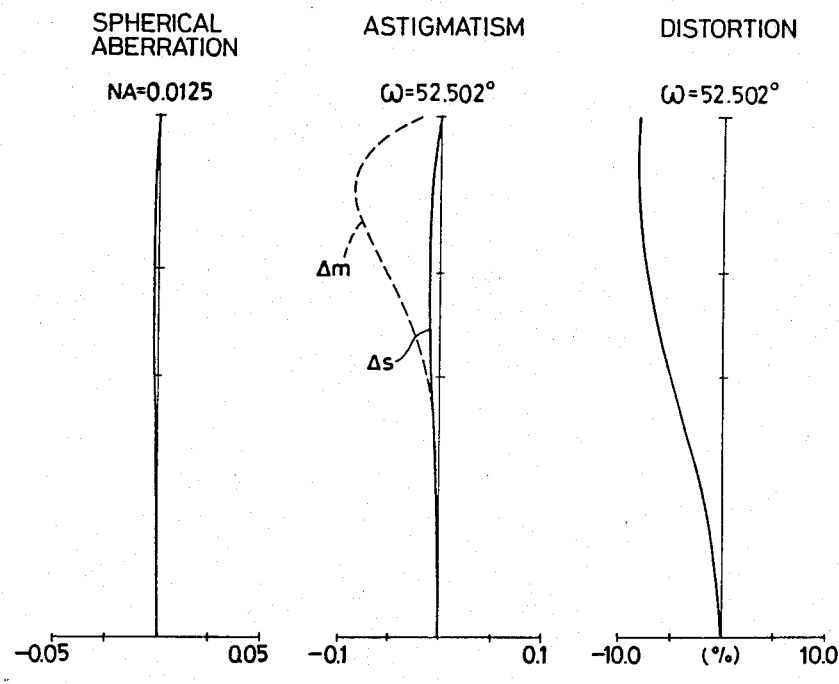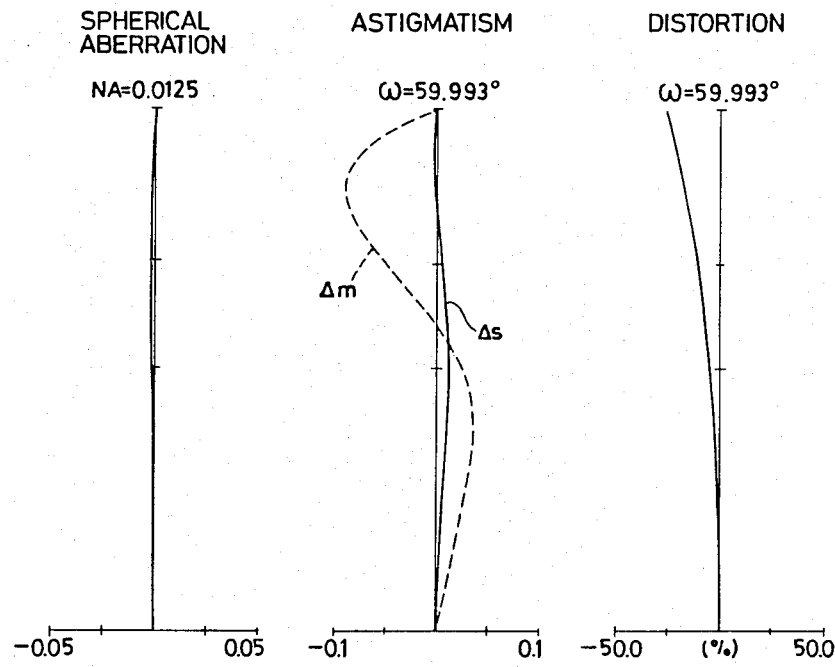

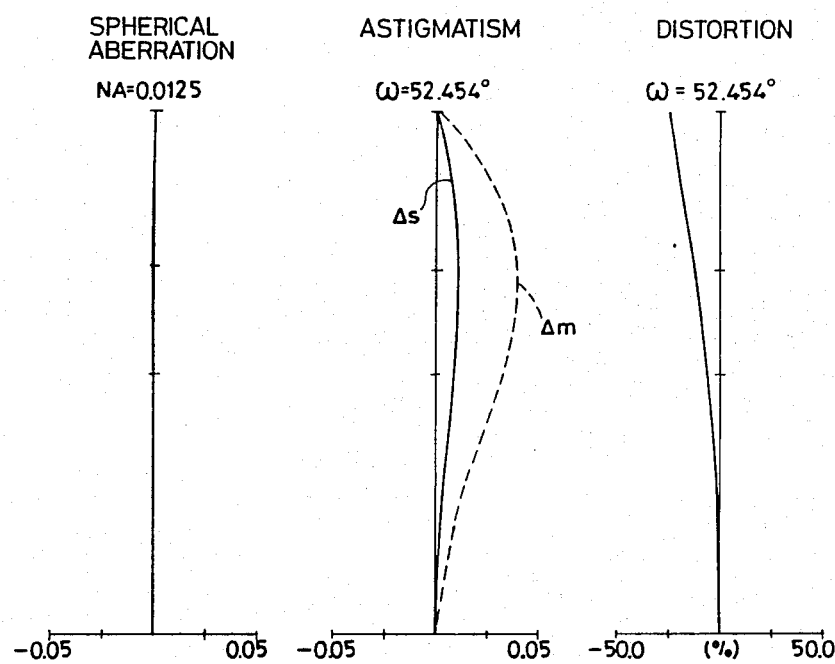
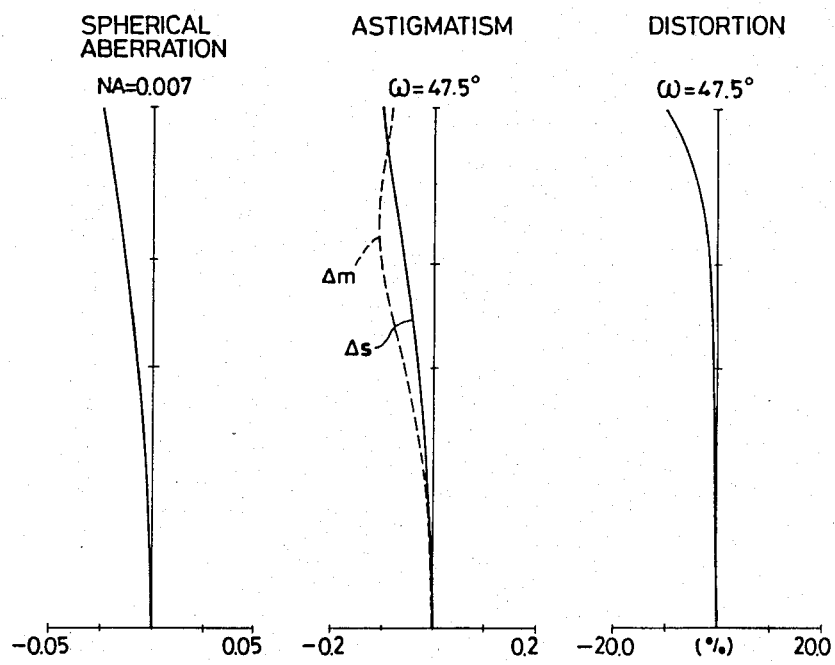

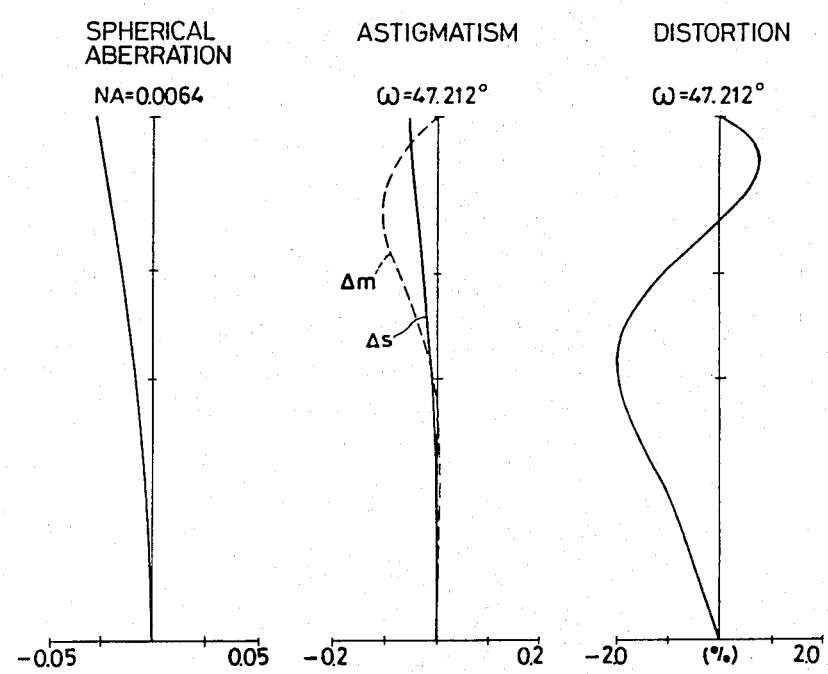
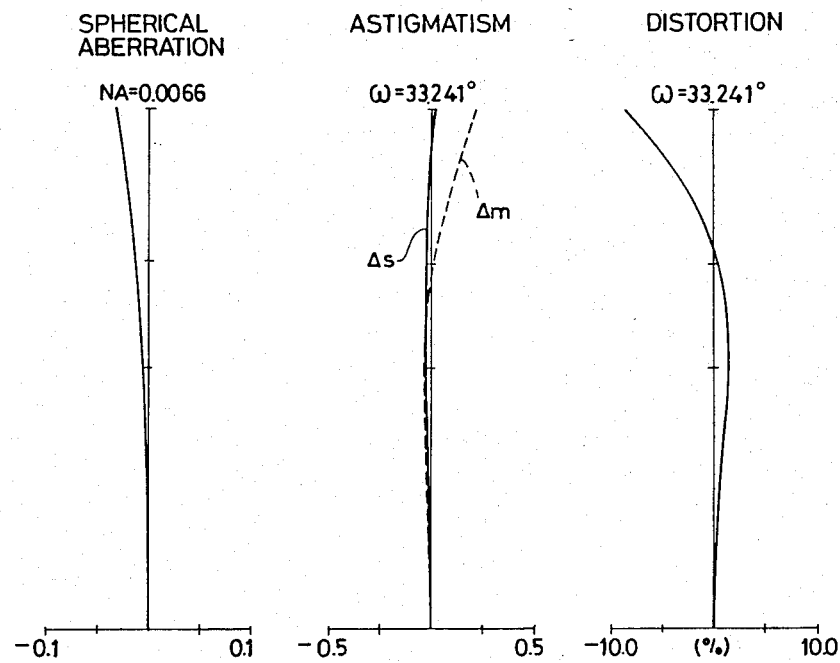

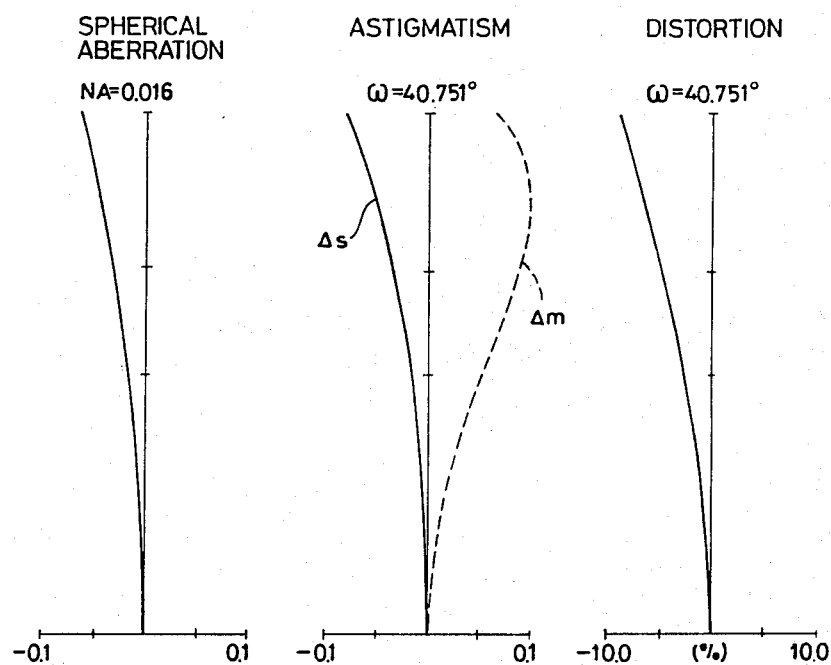
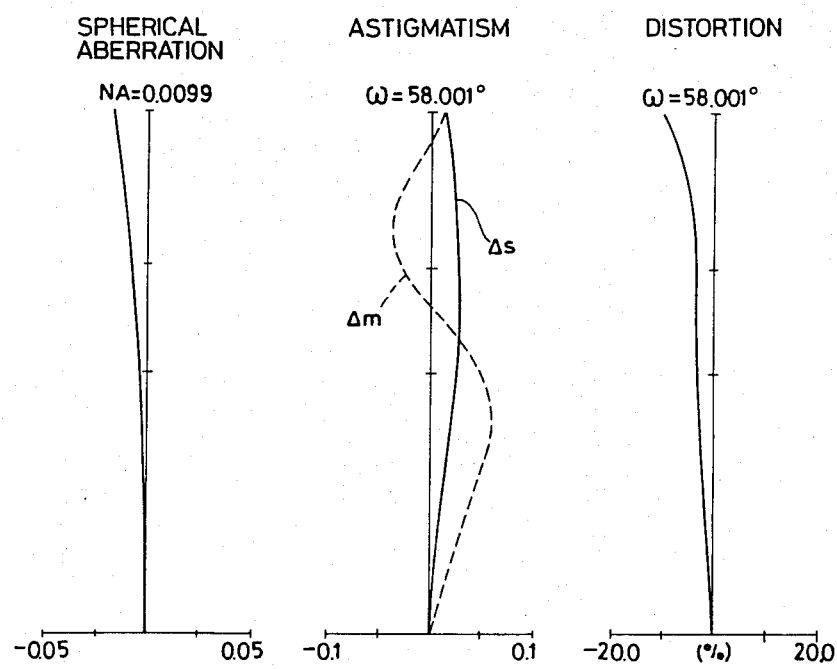

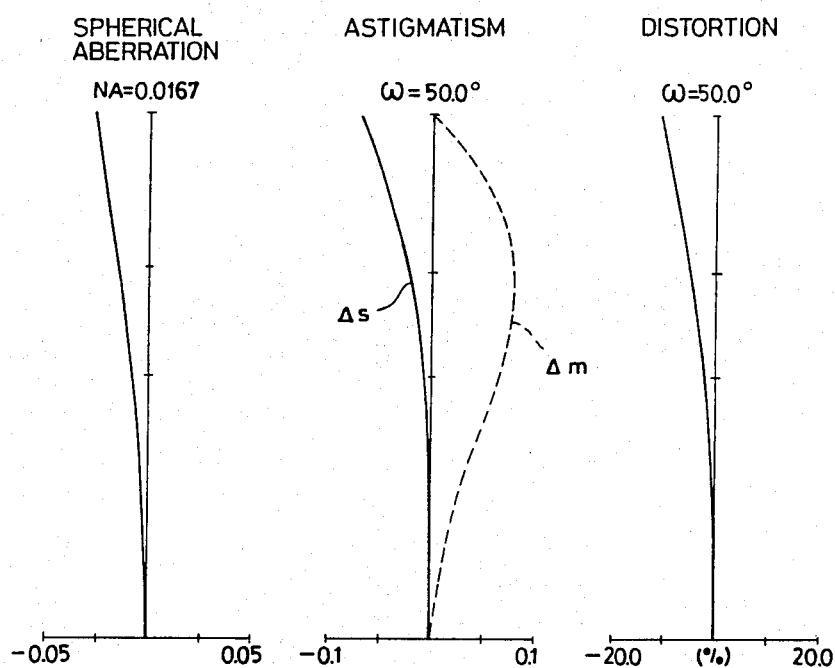
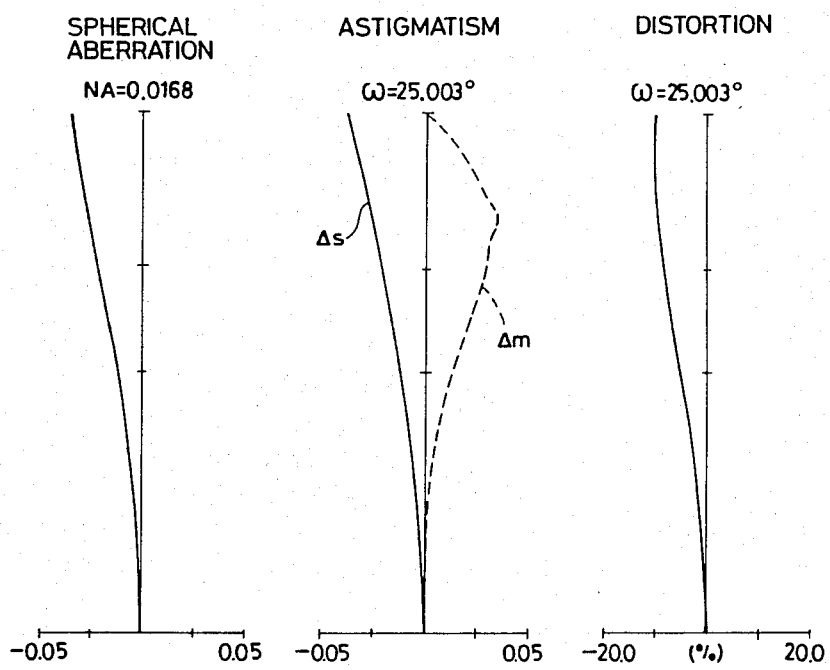

OBJECTIVE LENS SYSTEM FOR AN ENDOSCOPE

This is a continuation of application Ser. No. 816,869, filed Jan. 7, 1986, which was abandoned upon the filing hereof.

BACKGROUND OF THE INVENTION (a) Field of the invention

The present invention relates to an objective lens system for an endoscope and, more particularly, to an objective lens system to be used with a flexible-type endoscope employing an optical fiber bundle as an image transmission optical system or an inflexible-type endoscope employing relay lenses as an image transmission optical system, said objective lens system for an endoscope being especially arranged that the angle of view is wide and distortion and curvature of field are corrected favourably.

(b) Description of the prior art

As a conventional objective lens system for an endoscope of the retrofocus type as shown in FIG. 1, there has already been known, for example, the one disclosed by Japanese published unexamined patent application No. 121547/74. The above-mentioned known objective lens system for an endoscope comprises a lens group I having negative refractive power and a lens group II having positive refractive power which are arranged on the object side and image side with a stop S interposed therebetween. Said known objective lens system is so designed as to obtain a wide angle of view by strongly refracting the principal ray P by means of the lens group I located in front of the stop S and having negative refractive power and, furthermore, arranged that the lens group II located in rear of the stop S and having positive refractive power functions so that the principal ray P, which is incident on the image surface, is made parallel with the optical axis and enters the image guide G in that state. By making the principal ray P incident perpendicularly on the end surface of the image guide G as described in the above, it is possible to reduce the loss of light in the image guide G. Besides, when applying said known objective lens system to an inflexible-type endoscope which employs relay lenses, the principal ray P should be made perpendicular to the image surface O' as shown in FIG. 2 so as to reduce the loss of light in the relay lenses.

As described in the above, said known retrofocus-type objective lens system for an endoscope satisfies two requirements for objective lens systems for endoscopes, i.e., to make the angle of view wide and to make the principal ray, which is incident on the image surface, perpendicular to the image surface.

However, said known retrofocus-type objective lens system for an endoscope still has a disadvantage that negative distortion is remarkable. For example, in the objective lens system for an endoscope shown in FIG. 1, distortion is 21% at $\omega = 37°$ ($2\omega$ = angle of view). Besides, in cases of other known retrofocus-type objective lens systems for endoscopes, the relationship between the angle of view and distortion is as shown in the table below, i.e., negative distortion is remarkable.

| $\omega$ | 20° | 30° | 40° | 50° | 60° |
| --- | --- | --- | --- | --- | --- |
| distortion | −6% | −13.5% | −23% | −36% | −50% |

In order to correct the above-mentioned negative distortion, it is contrived to provide an aspherical surface in the objective lens system. The lens system disclosed by Japanese published unexamined patent application No. 173810/82 is known as an objective lens system for an endoscope having distortion and other aberrations corrected comparatively favourably by using an aspherical surface. However, in spite of the fact that said known objective lens system for an endoscope has a narrow angle of view ($2\omega$), i.e., 56°, distortion thereof is not corrected satisfactorily favourably.

SUMMARY OF THE INVENTION

It is, therefore, a primary object of the present invention to provide an objective lens system for an endoscope of which the angle of view is wide, distortion is corrected satisfactorily favourably and, moreover, curvature of field is corrected favourably.

The objective lens system for an endoscope according to the present invention has the lens composition, for example, as shown in FIG. 10 and as illustrated by Embodiment 1 described later, i.e., it comprises a lens unit I (front lens unit) having negative refractive power, a lens unit II (rear lens unit) having positive refractive power, and a stop S arranged between said lens units and in the vicinity of the front focal point of the lens unit II. Besides, the objective lens system for an endoscope according to the present invention is arranged that at least one of lens components constituting the front lens unit I is designed that at least the surface on the object side thereof is formed as an aspherical surface having portions whose curvature gradually becomes stronger as they are farther from the optical axis as illustrated by Embodiment 1 shown in FIG. 10 and/or at least one of lens components constituting the front lens unit I is designed that at least the surface on the image side thereof is formed as an aspherical surface having portions whose curvature gradually becomes weaker as they are farther from the optical axis as illustrated by Embodiment 6 shown in FIG. 15 and, moreover, the objective lens system for an endoscope according to the present invention is further arranged that at least one of lens components constituting the rear lens unit II is designed that at least the surface on the object side thereof is formed as an aspherical surface having portions whose curvature gradually becomes weaker as they are farther from the optical axis as illustrated by Embodiment 6 shown in FIG. 15 and/or at least one of lens components constituting the rear lens unit II is designed that at least the surface on the image side thereof is formed as an aspherical surface having portions whose curvature becomes stronger as they are farther from the optical axis as illustrated by Embodiment 1 shown in FIG. 10. The aspherical surfaces of these lens components are symmetrical in respect to the optical axis in the same way as other types of lenses.

For the objective lens system for an endoscope arranged as described in the above, it is possible to correct both of distortion and curvature of field satisfactorily favourably due to the reason described below.

The reason why the known objective lens system for an endoscope having the lens composition as shown in FIG. 1 causes remarkable negative distortion is that, when the principal ray is traced in reverse direction from the image side, the principal ray is refracted by the front lens unit I located in front of the stop S and rear lens unit II located in rear of the stop S in such direction that the angle of view is widened as the image height increases. Therefore, it is possible to correct the remarkable negative distortion when the lens system is provided with an aspherical surface having portions whose refractive power for the principal ray becomes weaker as they are farther from the optical axis. For this purpose, it may be so arranged that the surface on the object side of one of lens components constituting the front lens units I located in front of the stop S has such portions whose curvature gradually becomes stronger as they are farther from the optical axis as shown in FIG. 10, the surface on the image side of one of lens components constituting the front lens unit I has such portions whose curvature gradually becomes weaker as they are farther from the optical axis as shown in FIG. 15, the surface on the object side of one of lens components constituting the rear lens unit II has such poritons whose curvature gradually becomes weaker as they are farther from the optical axis as shown in FIG. 15, or the surface on the image side of one of lens components constituting the rear lens unit II has such portions whose curvature gradually becomes stronger as they are farther from the optical axis as shown in FIG. 10.

The above-mentioned surface having portions whose curvature gradually becomes stronger as they are farther from the optical axis can include the aspherical surfaces having the shapes as shown in FIGS. 3 and 4. "Curvature" used herein should be interpreted as a term including a positive or negative signal. Speaking concretely, curvature at an arbitrary point on a lens surface should be considered as negative when the center of curvature of a spherical surface, which is in contact with said lens surface at said arbitrary point, is located on the object side of said lens surface or positive when said center of curvature is located on the image side of said lens surface. Accordingly, the aspherical surface shown in FIG. 3 is an example whose curvature including the sign increases as it is farther from the optical axis (increases from negative curvature of concavity on the object side to positive curvature of convexity on the object side), while the aspherical surface shown in FIG. 4 is an example whose curvature increases and then decreases as it is farther from the optical axis.

The aspherical surface shown in FIG. 4 is also effective for correction of distortion because the undulation of distortion curve as shown in FIG. 5 poses no practical problem and because the peripheral portion of the aspherical surface shown in FIG. 4 has no relation to correction of distortion since the principal ray does not pass through the peripheral portion through the lower ray passes.

FIGS. 6 and 7 respectively show other examples of the aspherical surface which has portions whose curvature gradually becomes weaker as they are farther from the optical axis and which may be used for the surface on the image side of a lens component.

As described so far, the aspherical surface to be provided in the lens unit I of the objective lens system for an endoscope according to the present invention is formed, when it is used as a surface on the object side of a lens component, as a surface having curvature which gradually becomes stronger at least at portions thereof including such surfaces as shown in FIGS. 3 and 4 and is formed, when it is used as a surface on the image side of a lens component, as a surface having curvature which gradually becomes weaker at least at portions thereof including such surfaces as shown in FIGS. 6 and 7.

On the other hand, the aspherical surface to be provided in the lens unit II of the objective lens system for an endoscope accordingly to the present invention is formed, when it is used as a surface on the object side of a lens component, as a surface having curvature which gradually becomes weaker at least at portions thereof including such surfaces as shown in FIGS. 6 and 7 and is formed, when it is used as a surface on the image side of a lens component, as a surface having curvature which gradually becomes stronger at least portions thereof including such surfaces as shown in FIGS. 3 and 4.

For an objective lens system including one of the aspherical surfaces described in the above, it is possible to correct distortion favourably.

In case that it is desired to correct distortion only, it is sufficient when one of the above-mentioned aspherical surfaces is provided on only one side of the stop. In that case, however, swelling of meridional curvature of field at the intermediate image height becomes large as shown in FIG. 8 and, consequently, the quality of image at the intermediate image height decreases considerably. Therefore, when the above-mentioned aspherical surfaces are arranged in both of the front lens unit I and the rear lens unit II, it is possible to correct the above-mentioned swelling of meridional curvature of field because the sign of the swelling of meridional curvature of field to be caused by the aspherical surface arranged in the front lens unit I, i.e., the minus sign, is inverse to the sign of the meridional curvature of field to be caused by the aspherical surface arranged in the rear lens unit II, i.e., the plus sign, and the meridional curvature of field caused in the fornt lens unit I is offset by the meridional curvature of field caused in the rear lens unit II.

Due to the above-mentioned reason, the present invention makes it possible to obtain an objective lens system for an endoscope of which distortion is minimized and, moreover, curvature of field is corrected favourably.

Now, the shape of the aspherical surface required for correction of distortion is quantitatively described below.

An aspherical surface can generally be expressed by the following formula (1):

$$x = \frac{Cy^2}{1 + \sqrt{1 - PC^2y^2}} + By^2 + Ey^4 + Fy^6 + Gy^8 + \ldots \quad (1)$$

where, reference symbols x and y respectively represent values of coordinates in the coordinate system where the optical axis is traced as the x axis taking the image direction as positive and the y axis is traced perpendicularly to the x axis taking the intersecting point between the aspherical surface and optical axis as the origin O, reference symbol C represents the inverse number of the radius of curvature of the spherical surface which is in contact with the aspherical surface on the optical axis, reference symbol P represents a parameter representing the shape of the aspherical surface, and reference symbols B, E, F, G, ... respectively represent the coefficients of aspherical surface of the second power, fourth power, sixth power, eighth power and so on.

When P=1 and all of B, E, F, G, ... are zero in the formula (1) shown in the above, the surface expressed by the formula (1) is a spherical surface.

Besides, Seidel aberration coefficients are defined as shown below. These are the same as those used in the universal lens design program ACCOS-V.

For meridional ray ($\overline{X}=0$):

$$\Delta Y = (SA3)Y^3 + (CMA3)Y^2H + \{3(AST3) + \qquad (2)$$
$$(PTZ3)\}YH^2 + (DIS3)H^3 + (SA5)Y^5 + (CMA5)Y^4H +$$
$$(TOBSA)Y^3H^2 + (ELCMA)Y^2H^3 + \{5(AST5) + (PTA5)\}YH^4 +$$
$$(DIS5)H^5 + (SA7)Y^7$$

For sagittal ray ($Y = 0$):

$$\Delta Z = (SA3)Z^3 + \{(AST3) + (PTZ3)\}ZH^2 + (SA5)Z^5 + \qquad (3)$$
$$(SOBSA)Z^2H^2 + \{(AST5) + (PTZ5)\}ZH^4 + (SA7)Z^7$$

The formula (2) shown in the above is formulated by arranging that the difference between the paraxial image point (image point when there exists no aberration) of meridional rays and actual image point of meridional rays is represented by reference symbol $\Delta Y$. In the formula (2), reference symbol $\overline{Y}$ represents the incident height of paraxial principal ray on the image surface normalized by the maximum image height, reference symbol $\overline{H}$ represents the incident height of marginal ray on the pupil surface normalized by the pupil diameter, reference symbols SA3, SA5 and SA7 respectively represent spherical aberrations of the third, fifth and seventh orders, reference symbols CMA3 and CMA5 respectively represent tangential comas of the third and fifth orders, reference symbols AST3 and AST5 respectively represent astigmatisms of the third and fifth orders, reference symbols PTZ3 and PTZ5 respectively represent Petzval's sums of the third and fifth orders, reference symbols DIS3 and DIS5 respectively represent distortions of the third and fifth orders, reference symbol TOBSA represents skew tangential spherical aberration of the fifth order, reference symbol ELCMA represents elliptical coma of the fifth order, and reference symbol SOBSA represents skew sagittal spherical aberration of the fifth order.

For the formula (3), the manner of formulation and description of reference symbols are the same as those of the formula (2).

When actually calculating the aberration coefficients, the height of marginal ray $H_0$ incident on the first surface of the lens system is defined as shown below where the object distance (distance from the object point to the first surface of the lens system) is represented by reference symbol OB, numerical aperture of marginal ray is represented by reference symbol NA, and refractive index of the medium of the object space is represented by reference symbol $n_0$, $$H_0 = OB \times \frac{NA}{n_0}$$

and the aberration coefficients are calculated by using the formula shown in the above.

Swelling of meridional curvature of field, which occurs when an aspherical surface is arranged in a lens system, is caused by the deviation of the aspherical surface from the spherical surface and is caused due to the fact that the ratio of the value of the coefficient of astigmatism A of the third power to the coefficient of astigmatism of the fifth power in the formulas (2) and (3) of Seidel aberration coefficients shown in the above is large compared with that of the spherical surface. Therefore, the astigmatism caused by the aspherical surface arranged in the front lens unit I should be offset by the aspherical surface arranged in the rear lens unit II.

That is, when the sums $A_F$ and $A_R$ of the coefficients of astigmatism is expressed by the formulas (4) and (5) shown below where the coefficient of astigmatism A to be caused by the deviation of the aspherical surface, which is formed on ith surface out of respective lens surfaces in the front lens unit, from the spherical surface is represented by reference symbol $A_{Fi}$ and the coefficient of astigmatism A to be caused by the deviation of the aspherical surface, which is formed on jth surface out of respective lens surfaces in the rear lens unit, from the spherical surface is represented by reference symbol $A_{Rj}$.

$$A_F = \sum_i A_{Fi} \qquad (4)$$

$$A_R = \sum_j A_{Rj} \qquad (5)$$

It is necessary to arrange that the value of $A_{FR}$ given by the following formula (6) becomes a value close to zero.

$$A_{FR} = A_F + A_R \qquad (6)$$

Alternatively, when the content shown by the formula (6) is expressed by other formulas, it is possible to express said content as shown by the following formulas (7) and (8).

$$A_F \cdot A_R < 0 \qquad (7)$$

$$|A_F/A_R| \approx 1 \qquad (8)$$

When the values of $A_F$, $A_R$ and $A_F/A_R$ shown in the formulas (7) and (8) are calculated by using the lens system shown in FIG. 10 as an example, they become as shown below.

$$A_F = -0.01847$$

$$A_R = 0.0294$$

$$A_F/A_R = -0.62823$$

As it will be evident from respective embodiments shown later, it is possible to correct aberrations satisfactorily favourably even when the value of $|A_F/A_R|$ is not exactly 1 as far as said value comes into the range defined by the following formula (9).

$$0.01 < |A_F/A_R| < 10 \qquad (9)$$

In other words, when the shapes of the aspherical surfaces are decided so as to fulfill the formulas (7) and (9), it is possible to obtain an objective lens system for an endoscope of which both of distortion and curvature of field are corrected favourably.

The coefficient of astigmatism $A_i$ of the third power to be caused by the deviation of the aspherical surface on ith surface is expressed by the following formula (10):

$$A_i = 8h_a^2 h_b^2 \cdot E(N_i - N_{i+1}) \qquad (10)$$

where, reference symbols $h_a$ and $h_b$ respectively represent heights of paraxial ray and paraxial principal ray on ith surface, reference symbol E represents the coefficient of aspherical surface of the fourth power of ith surface, and reference symbols $N_i$ and $N_{i+1}$ respectively represent refractive indices of media on the object side and image side of ith surface.

Here, an aspherical surface may be provided to a cemented surface between two lens elements. In that case, when the lens element with the lower refractive index is regarded as the air side, the shape of the aspherical surface can be decided in the same way as described in the above, and it is possible to form an aspherical surface that serves the object of the present invention.

Generally, distortion occurs largely on a surface where the height of principal ray is large. Therefore, for correction of distortion, it is preferable to provide an aspherical surface to a surface where the height of principal ray is large. In other words, it is preferable to form a surface located far from the stop as an aspherical surface, for example, a surface near the first lens or a surface near the rearmost lens.

For the manufacture of an aspherical surface, it is preferable to adopt plastic molding or glass molding from the view point of the cost. Especially, lenses manufactured by glass molding are more preferable because they are more excellent in chemical resistance and the like compared with lenses manufactured by plastic molding.

BRIEF DESCRIPTION OF THE DRAWINGS

FIGS. 1 and 2 respectively show sectional views of known objective lens systems for endoscopes;

FIGS. 3 and 4 respectively show sectional views of examples of aspherical surfaces to be used in the objective lens system for an endoscope according to the present invention;

FIG. 5 shows a graph illustrating an example of distortion;

FIGS. 24 through 37 respectively show graphs illustrating aberration curves of Embodiments 1 through 14 of the present invention.

DETAILED DESCRIPTION OF THE PREFERRED EMBODIMENTS

Figure 6:
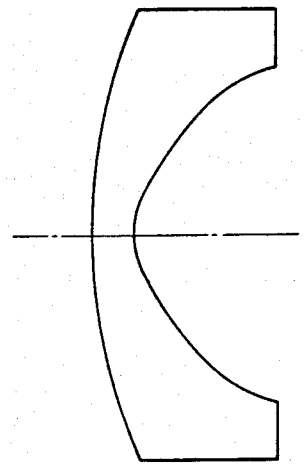
FIGS. 6 and 7 respectively show sectional views of other examples of aspherical surfaces to be used in the objective lens system for an endoscope according to the present invention.
Figure 7:
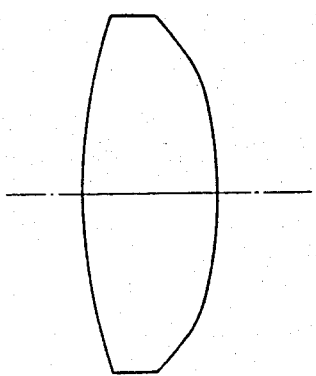
Figure 8:
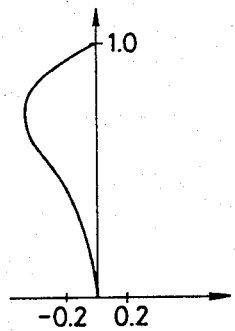
FIG. 8 shows a graph illustrating an example of curvature of field of a lens system in which an aspherical surface is provided only on one side of the stop, i.e., either on the front or rear side.
Figure 9:
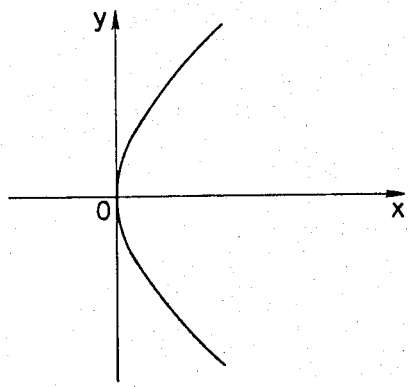
FIG. 9 shows a coordinate system for illustrating the formula which expresses the shape of an aspherical surface.

Now, preferred embodiments of the objective lens system for an endoscope according to the present invention are shown below.

Embodiment 1

| | | |
|---|---|---|
| $r_1 = 6.1180$ | (aspherical surface) | |
| $d_1 = 0.5298$ | $n_1 = 1.51633$ | $\nu_1 = 64.15$ |
| $r_2 = 0.6522$ | | |
| $d_2 = 0.8609$ | | |
| $r_3 = \infty$ (stop) | | |
| $d_3 = 0.1987$ | | |

-continued

| | | |
|---|---|---|
| $r_4 = -5.6100$ | | |
| $d_4 = 1.1921$ | $n_2 = 1.58913$ | $\nu_2 = 61.11$ |
| $r_5 = -1.4817$ | | |
| $d_5 = 0.1325$ | | |
| $r_6 = 197.8841$ | | |
| $d_6 = 1.1921$ | $n_3 = 1.58913$ | $\nu_3 = 61.11$ |
| $r_7 = -4.2546$ | | |
| $d_7 = 0.1325$ | | |
| $r_8 = 2.4509$ | | |
| $d_8 = 1.9868$ | $n_4 = 1.61800$ | $\nu_4 = 63.38$ |
| $r_9 = -2.4826$ | | |
| $d_9 = 0.4503$ | $n_5 = 1.84666$ | $\nu_5 = 23.90$ |
| $r_{10} = -50.0313$ | (aspherical surface) | |
| $d_{10} = 0.2181$ | | |
| $r_{11} = 2.5823$ | | |
| $d_{11} = 1.0680$ | $n_6 = 1.51633$ | $\nu_6 = 64.15$ |
| $r_{12} = \infty$ | | |
| $f = 1, 2\omega = 105.004°$ | | |
| aspherical surface coefficient of 1st surface | | |
| $P = 1, E = 0.58449 \times 10^{-1}$ | | |
| $F = -0.20633 \times 10^{-2}$ | | |
| aspherical surface coefficient of 10th surface | | |
| $P = 1, E = 0.49349 \times 10^{-1}$ | | |
| $F = 0.11654 \times 10^{-1}$ | | |
| $A_F = -0.01847, A_R = 0.0294$ | | |
| $A_F/A_R = -0.62823, f_1 = -1.462, D_1 = 1.06$ | | |

Embodiment 2

| | | |
|---|---|---|
| $r_1 = 6.3984$ | (aspherical surface) | |
| $d_1 = 0.5595$ | $n_1 = 1.51633$ | $\nu_1 = 64.15$ |
| $r_2 = 0.6778$ | | |
| $d_2 = 0.9092$ | | |
| $r_3 = \infty$ (stop) | | |
| $d_3 = 0.2098$ | | |
| $r_4 = -5.5166$ | | |
| $d_4 = 1.2588$ | $n_2 = 1.58913$ | $\nu_2 = 61.11$ |
| $r_5 = -1.5634$ | | |
| $d_5 = 0.1399$ | | |
| $r_6 = 29.9814$ | | |
| $d_6 = 1.2588$ | $n_3 = 1.58913$ | $\nu_3 = 61.11$ |
| $r_7 = -4.3416$ | | |
| $d_7 = 0.1399$ | | |
| $r_8 = 2.8491$ | | |
| $d_8 = 2.0980$ | $n_4 = 1.61800$ | $\nu_4 = 63.38$ |
| $r_9 = -2.3590$ | | |
| $d_9 = 0.4755$ | $n_5 = 1.84666$ | $\nu_5 = 23.90$ |
| $r_{10} = -148.8749$ | | |
| $d_{10} = 0.2114$ | | |
| $r_{11} = 1.7587$ | (aspherical surface) | |
| $d_{11} = 1.1277$ | $n_6 = 1.51633$ | $\nu_6 = 64.15$ |
| $r_{12} = \infty$ | | |
| $f = 1, 2\omega = 119.986°$ | | |
| aspherical surface coefficient of 1st surface | | |
| $P = 1, E = -0.35094 \times 10^{-1}$ | | |
| $F = -0.35734 \times 10^{-2}$ | | |
| aspherical surface coefficient of 11th surface | | |
| $P = 1, E = -0.11938$ | | |
| $F = 0.11557 \times 10^{-2}$ | | |
| $A_F = -0.01539, A_R = 0.04461$ | | |
| $A_F/A_R = -0.34499, f_1 = -1.519, D_1 = 1.119$ | | |

Embodiment 3

| | | |
|---|---|---|
| $r_1 = 4.2490$ | (aspherical surface) | |
| $d_1 = 0.4310$ | $n_1 = 1.51633$ | $\nu_1 = 64.15$ |
| $r_2 = 0.5336$ | | |
| $d_2 = 0.7004$ | | |
| $r_3 = \infty$ (stop) | | |
| $d_3 = 0.1616$ | | |
| $r_4 = -5.1135$ | | |
| $d_4 = 0.9698$ | $n_2 = 1.58913$ | $\nu_2 = 61.11$ |
| $r_5 = -1.1946$ | | |
| $d_5 = 0.1078$ | | |
| $r_6 = 431.8244$ | | |
| $d_6 = 0.9698$ | $n_3 = 1.58913$ | $\nu_3 = 61.11$ |
| $r_7 = -3.3672$ | | |
| $d_7 = 0.1078$ | | |

-continued

```
r8  = 2.4551
d8  = 1.6164      n4 = 1.68100       ν4 = 63.38
r9  = −1.6551
d9  = 0.3664      n5 = 1.84666       ν5 = 23.90
r10 = 10.7060     (aspherical surface)
d10 = 0.3668
r11 = 1.7661
d11 = 1.0237      n6 = 1.51633       ν6 = 64.15
r12 = ∞
```
f = 1, 2ω = 104.908°
aspherical surface coefficient of 1st surface
P = 1, E = $0.38819 \times 10^{-1}$
F = $-0.23129 \times 10^{-2}$
aspherical surface coefficient of 10th surface
P = 1, E = $0.42299 \times 10^{-1}$
F = $-0.15892 \times 10^{-1}$
$A_F$ = −0.00364, $A_R$ = 0.00995
$A_F/A_R$ = −0.36583, $f_1$ = −1.231, $D_1$ = 0.862

Embodiment 4

```
r1  = 6.8768      (aspherical surface)
d1  = 0.7795      n1 = 1.88300       ν1 = 40.78
r2  = 1.9045
d2  = 4.2438
r3  = ∞ (stop)
d3  = 0.6058
r4  = −18.3568
d4  = 0.8762      n2 = 1.69680       ν2 = 55.52
r5  = −3.5516
d5  = 0.3341
r6  = 2.4922
d6  = 1.5367      n3 = 1.64000       ν3 = 60.09
r7  = −1.7814
d7  = 0.4454      n4 = 1.84666       ν4 = 23.88
r8  = −3.4576    (aspherical surface)
```
f = 1, 2ω = 95.0°
aspherical surface coefficient of 1st surface
P = 1, E = $0.63687 \times 10^{-2}$
F = $-0.12992 \times 10^{-3}$
aspherical surface coefficient of 8th surface
P = 1, E = $0.22882 \times 10^{-1}$
F = $-0.38644 \times 10^{-2}$
$A_F$ = −0.00116, $A_R$ = 0.01893
$A_F/A_R$ = −0.06128, $f_1$ = −3.22, $D_1$ = 4.85

Embodiment 5

```
r1  = 9.3756      (aspherical surface)
d1  = 0.8621      n1 = 1.88300       ν1 = 40.78
r2  = 2.0517
d2  = 4.8958
r3  = ∞ (stop)
d3  = 0.8554
r4  = 15.9800
d4  = 0.9690      n2 = 1.69680       ν2 = 55.52
r5  = −5.9752
d5  = 0.3695
r6  = 3.4698
d6  = 1.6374      n3 = 1.64000       ν3 = 60.09
r7  = −1.7857
d7  = 0.4926      n4 = 1.84666       ν4 = 23.88
r8  = −2.9875    (aspherical surface)
```
f = 1, 2ω = 94.424°
aspherical surface coefficient of 1st surface
P = 1, E = $0.41951 \times 10^{-2}$
F = $0.52825 \times 10^{-4}$
aspherical surface coefficient of 8th surface
P = 1, E = $0.18885 \times 10^{-1}$
F = $0.24735 \times 10^{-2}$
$A_F$ = −0.00001, $A_R$ = 0.00003
$A_F/A_R$ = −0.33333, $f_1$ = −3.148, $D_1$ = 5.751

Embodiment 6

```
r1  = 4.1406
d1  = 0.8005      n1 = 1.88300       ν1 = 40.76
r2  = 1.1345      (aspherical surface)
d2  = 4.1302
r3  = ∞ (stop)
d3  = 0.3680
r4  = 6.9159
d4  = 0.8469      n2 = 1.69680       ν2 = 55.52
r5  = −4.1736
d5  = 1.7075
r6  = 2.8187      (aspherical surface)
d6  = 1.9723      n3 = 1.64000       ν3 = 60.09
r7  = −1.4348
d7  = 0.5801      n4 = 1.84666       ν4 = 23.88
r8  = −4.0238
```
f = 1, 2ω = 66.482°
aspherical surface coefficient of 2nd surface
P = 1, E = $-0.92345 \times 10^{-1}$
F = $0.33387 \times 10^{-1}$
aspherical surface coefficient of 6th surface
P = 1, E = $-0.79246 \times 10^{-2}$
F = $0.36822 \times 10^{-2}$
$A_F$ = −0.01433, $A_R$ = 0.00246
$A_F/A_R$ = −5.8252, $f_1$ = −2.002, $D_1$ = 4.498

Embodiment 7

```
r1  = ∞           (aspherical surface)
d1  = 0.5725      n1 = 1.51633       ν1 = 64.15
r2  = ∞ (stop)
d2  = 1.3991      n2 = 1.80610       ν2 = 40.95
r3  = −1.2000
d3  = 0.5436
r4  = 1.5780      (aspherical surface
d4  = 1.2126      n3 = 1.80610       ν3 = 40.95
r5  = ∞
```
f = 1, 2ω = 81.502°
aspherical surface coefficient of 1st surface
P = 1, E = 0.12374, F = 0
aspherical surface coefficient of 4th surface
P = 1, E = $-0.87329 \times 10^{-1}$
F = $-0.18044 \times 10^{-1}$
$A_F$ = −0.00267, $A_R$ = 0.01139
$A_F/A_R$ = −0.23442

Embodiment 8

```
r1  = 16.1623     (aspherical surface)
d1  = 0.7273      n1 = 1.49109       ν1 = 57.00
r2  = 1.6598
d2  = 1.2510
r3  = 19.6061
d3  = 1.1736      n2 = 1.78800       ν2 = 47.43
r4  = 1.9317
d4  = 1.0628
r5  = ∞ (stop)
d5  = 0.1119
r6  = 14.1042
d6  = 1.2096      n3 = 1.58913       ν3 = 60.97
r7  = −2.9033
d7  = 0.6212
r8  = −17.7424
d8  = 1.1115      n4 = 1.58913       ν4 = 60.97
r9  = −3.1102
d9  = 0.1372
r10 = 6.4185
d10 = 2.1674      n5 = 1.61800       ν5 = 63.38
r11 = −2.2840
d11 = 0.2467      n6 = 1.84666       ν6 = 23.90
r12 = −8.1806
d12 = 0.6832
r13 = 2.5389      (aspherical surface)
d13 = 2.5050      n7 = 1.49109       ν7 = 57.00
r   = ∞
```
f = 1, 2ω = 116.002°
aspherical surface coefficient of 1st surface
P = 1, E = $0.79514 \times 10^{-2}$, F = 0
aspherical surface coefficient of 13th surface -continued P = 1, E = −0.26623 × 10⁻¹, F = 0
$A_F = -0.01083$, $A_R = 0.03888$
$A_F/A_R = -0.27855$, $f_F = -1.251$ Embodiment 9

| | | |
|---|---|---|
| $r_1 = 13.3333$ | | |
| $d_1 = 0.7333$ | $n_1 = 1.49109$ | $\nu_1 = 57.00$ |
| $r_2 = 3.6471$ (aspherical surface) | | |
| $d_2 = 1.0730$ | | |
| $r_3 = 2240.3652$ | | |
| $d_3 = 2.1988$ | $n_2 = 1.78800$ | $\nu_2 = 47.43$ |
| $r_4 = 1.2225$ | | |
| $d_4 = 1.0494$ | | |
| $r_5 = \infty$ (stop) | | |
| $d_5 = 0.1241$ | | |
| $r_6 = -77.6317$ | | |
| $d_6 = 1.2380$ | $n_3 = 1.58913$ | $\nu_3 = 60.97$ |
| $r_7 = -1.9899$ | | |
| $d_7 = 0.7377$ | | |
| $r_8 = -6.0607$ | | |
| $d_8 = 1.3244$ | $n_4 = 1.58913$ | $\nu_4 = 60.97$ |
| $r_9 = -2.7972$ | | |
| $d_9 = 0.1333$ | | |
| $r_{10} = 4.3283$ | | |
| $d_{10} = 2.1067$ | $n_5 = 1.61800$ | $\nu_5 = 63.38$ |
| $r_{11} = -2.2200$ | | |
| $d_{11} = 0.4667$ | $n_6 = 1.84666$ | $\nu_6 = 23.90$ |
| $r_{12} = -16.4147$ | | |
| $d_{12} = 0.9325$ | | |
| $r_{13} = 2.0725$ (aspherical surface) | | |
| $d_{13} = 1.9851$ | $n_7 = 1.49109$ | $\nu_7 = 57.00$ |
| $r_{14} = \infty$ | | |

$f = 1$, $2\omega = 115.9°$
aspherical surface coefficient of 2nd surface
P = 1, E = −0.11242 × 10⁻¹, F = 0
aspherical surface coefficient of 13th surface
P = 1, E = −0.54135 × 10⁻¹, F = 0
$A_F = -0.01753$, $A_R = 0.05767$
$A_F/A_R = -0.30397$, $f_F = -1.151$ Embodiment 10

| | | |
|---|---|---|
| $r_1 = 5.8227$ (aspherical surface) | | |
| $d_1 = 0.6155$ | $n_1 = 1.88300$ | $\nu_1 = 40.78$ |
| $r_2 = 1.7026$ | | |
| $d_2 = 1.0434$ | | |
| $r_3 = 2.3876$ | | |
| $d_3 = 0.4505$ | $n_2 = 1.78800$ | $\nu_2 = 47.43$ |
| $r_4 = 0.9653$ | | |
| $d_4 = 0.8366$ | | |
| $r_5 = \infty$ (stop) | | |
| $d_5 = 0.1222$ | | |
| $r_6 = -7.1626$ | | |
| $d_6 = 1.1660$ | $n_3 = 1.58913$ | $\nu_3 = 60.97$ |
| $r_7 = -1.5456$ | | |
| $d_7 = 0.6796$ | | |
| $r_8 = -5.6290$ | | |
| $d_8 = 1.1942$ | $n_4 = 1.58913$ | $\nu_4 = 60.97$ |
| $r_9 = -2.7189$ | | |
| $d_9 = 0.1287$ | | |
| $r_{10} = 3.5875$ | | |
| $d_{10} = 2.0335$ | $n_5 = 1.61800$ | $\nu_5 = 63.38$ |
| $r_{11} = -2.1429$ | | |
| $d_{11} = 0.3520$ | $n_6 = 1.84666$ | $\nu_6 = 23.90$ |
| $r_{12} = 20.9041$ | | |
| $d_{12} = 0.5519$ | | |
| $r_{13} = 2.1991$ (aspherical surface) | | |
| $d_{13} = 2.2863$ | $n_7 = 1.49109$ | $\nu_7 = 57.00$ |
| $r_{14} = \infty$ | | |

$f = 1$, $2\omega = 112.91°$
aspherical surface coefficient of 1st surface
P = 1, E = 0.96277 × 10⁻², F = 0
aspherical surface coefficient of 13th surface
P = 1, E = −0.32235 × 10⁻¹, F = 0
$A_F = -0.01292$, $A_R = 0.03088$ -continued $A_F/A_R = -0.41839$, $f_F = -1.044$ Embodiment 11

| | | |
|---|---|---|
| $r_1 = \infty$ (aspherical surface) | | |
| $d_1 = 0.2681$ | $n_1 = 1.51633$ | $\nu_1 = 64.15$ |
| $r_2 = 1.0400$ | | |
| $d_2 = 1.4189$ | | |
| $r_3 = 2.1359$ | | |
| $d_3 = 0.5362$ | $n_2 = 1.59270$ | $\nu_2 = 35.29$ |
| $r_4 = -1.5405$ | | |
| $d_4 = 0.2145$ | $n_3 = 1.83400$ | $\nu_3 = 37.16$ |
| $r_5 = -3.9303$ | | |
| $d_5 = 0.0536$ | | |
| $r_6 = \infty$ (stop) | | |
| $d_6 = 0.0536$ | | |
| $r_7 = 3.1352$ | | |
| $d_7 = 0.5898$ | $n_4 = 1.62041$ | $\nu_4 = 60.27$ |
| $r_8 = -0.6278$ | | |
| $d_8 = 0.2145$ | $n_5 = 1.80518$ | $\nu_5 = 25.43$ |
| $r_9 = -1.2322$ | | |
| $d_9 = 0.8609$ | | |
| $r_{10} = -2.2697$ | | |
| $d_{10} = 0.2681$ | $n_6 = 1.84666$ | $\nu_6 = 23.88$ |
| $r_{11} = -1.9100$ (aspherical surface) | | |

$f = 1$, $2\omega = 100.0°$
aspherical surface coefficient of 1st surface
P = 1, E = 0.39752 × 10⁻²
aspherical surface coefficient of 11th surface
P = 1, E = 0.25509
$A_F = -0.00044$, $A_R = 0.01371$
$A_F/A_R = -0.03209$, $E_F = 0.003975$
$E_B = 0.25509$, $E_B/E_F = 64.17$
$f_4 = 10.608$ Embodiment 12

| | | |
|---|---|---|
| $r_1 = \infty$ (aspherical surface) | | |
| $d_1 = 0.2772$ | $n_1 = 1.51633$ | $\nu_1 = 64.15$ |
| $r_2 = 0.8565$ | | |
| $d_2 = 1.5573$ | | |
| $r_3 = 2.4166$ | | |
| $d_3 = 0.5543$ | $n_2 = 1.59270$ | $\nu_2 = 35.29$ |
| $r_4 = -2.1023$ | | |
| $d_4 = 0.2217$ | $n_3 = 1.83400$ | $\nu_3 = 37.16$ |
| $r_5 = -3.7245$ | | |
| $d_5 = 0.0554$ | | |
| $r_6 = \infty$ (stop) | | |
| $d_6 = 0.0554$ | | |
| $r_7 = 3.1854$ | | |
| $d_7 = 0.6098$ | $n_4 = 1.62041$ | $\nu_4 = 60.27$ |
| $r_8 = -0.6391$ | | |
| $d_8 = 0.2217$ | $n_5 = 1.80518$ | $\nu_5 = 25.43$ |
| $r_9 = -1.2642$ | | |
| $d_9 = 0.8900$ | | |
| $r_{10} = -1.7084$ | | |
| $d_{10} = 0.2772$ | $n_6 = 1.84666$ | $\nu_6 = 23.88$ |
| $r_{11} = -2.1791$ (aspherical surface) | | |

$f = 1$, $2\omega = 50.006°$
aspherical surface coefficient of 1st surface
P = 1, E = 0.25013 × 10⁻¹
aspherical surface coefficient of 11th surface
P = 1, E = 0.11723, F = 0.11906
$A_F = -0.00283$, $A_R = 0.00718$
$A_F/A_R = -0.39415$, $E_F = 0.02501$
$E_B = 0.1172$, $E_B/E_F = 4.686$
$f_4 = -12.795$ Embodiment 13

| | | |
|---|---|---|
| $r_1 = \infty$ (aspherical surface) | | |
| $d_1 = 0.2743$ | $n_1 = 1.51633$ | $\nu_1 = 64.15$ |
| $r_2 = 0.8373$ | | |
| $d_2 = 1.5685$ | | |
| $r_3 = 4.2174$ | | |

-continued

| | | |
|---|---|---|
| $d_3 = 0.5485$ | $n_2 = 1.59270$ | $\nu_2 = 35.29$ |
| $r_4 = -10.5058$ | | |
| $d_4 = 0.2194$ | $n_3 = 1.83400$ | $\nu_3 = 37.16$ |
| $r_5 = -3.4706$ | | |
| $d_5 = 0.0549$ | | |
| $r_6 = \infty$ (stop) | | |
| $d_6 = 0.0549$ | | |
| $r_7 = 2.6304$ | | |
| $d_7 = 0.6034$ | $n_4 = 1.62041$ | $\nu_4 = 60.27$ |
| $r_8 = -0.7752$ | | |
| $d_8 = 0.2194$ | $n_5 = 1.80518$ | $\nu_5 = 25.43$ |
| $r_9 = -1.4995$ | | |
| $d_9 = 0.8795$ | | |
| $r_{10} = -2.2103$ | | |
| $d_{10} = 0.2743$ | $n_6 = 1.84666$ | $\nu_6 = 23.88$ |
| $r_{11} = -4.1560$ (aspherical surface) | | |

$f = 1, 2\omega = 99.978°$
aspherical surface coefficient of 1st surface
$P = 1, E = 0.15461 \times 10^{-1}$
$F = 0.13610 \times 10^{-2}$
aspherical surface coefficient of 11th surface
$P = 1, E = 0.14239, F = 0.19039$
$A_F = -0.00158, A_R = 0.00701$
$A_F/A_R = -0.22539, E_F = 0.01546$
$E_B = 0.1424, E_B/E_F = 9.211$
$f_4 = -5.961$ Embodiment 14

| | | |
|---|---|---|
| $r_1 = -10.5764$ | | |
| $d_1 = 0.2644$ | $n_1 = 1.51633$ | $\nu_1 = 64.15$ |
| $r_2 = 0.8576$ (aspherical surface) | | |
| $d_2 = 1.4849$ | | |
| $r_3 = 4.0495$ | | |
| $d_3 = 0.5887$ | $n_2 = 1.5927$ | $\nu_2 = 35.29$ |
| $r_4 = -3.11$ | | |
| $d_4 = 0.015$ | | |
| $r_5 = \infty$ (stop) | | |
| $d_5 = 0.0017$ | | |
| $r_6 = 2.5394$ | | |
| $d_6 = 0.5817$ | $n_3 = 1.62041$ | $\nu_3 = 60.27$ |
| $r_7 = -0.783$ | | |
| $d_7 = 0.2115$ | $n_4 = 1.80518$ | $\nu_4 = 25.43$ |
| $r_8 = -1.4395$ | | |
| $d_8 = 0.7633$ | | |
| $r_9 = -2.2144$ | | |
| $d_9 = 0.2712$ | $n_5 = 1.84666$ | $\nu_5 = 23.88$ |
| $r_{10} = -3.4775$ (aspherical surface) | | |

$f = 1, 2\omega = 105.97°$
aspherical surface coefficient of 2nd surface
$P = 1, E = -0.6762 \times 10^{-1}$
$F = -0.98299 \times 10^{-1}$
aspherical surface coefficient of 10th surface
$P = 1, E = 0.28784$
$F = -0.63525 \times 10^{-1}$
$A_F = -0.00404, A_R = 0.01655$
$A_F/A_R = -0.2441, E_F = -0.06762$
$E_B = 0.28784, E_B/E_F = 4.257$
$f_4 = -7.987$ In respective embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol f represents the focal length of the lens system as a whole. Out of the coefficients of aspherical surface, those which are not shown in the numerical data are zero.

Now, respective embodiments shown in the above are described in further detail in the following.

Figure 10:
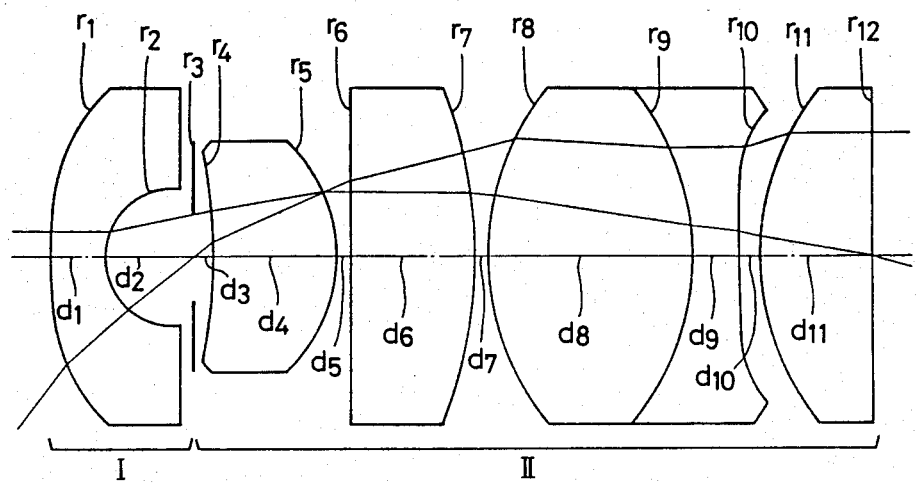
FIGS. 10 through 23 respectively show sectional views of Embodiments 1 through 14 of the object lens system for an endoscope according to the present invention.
Figure 11:
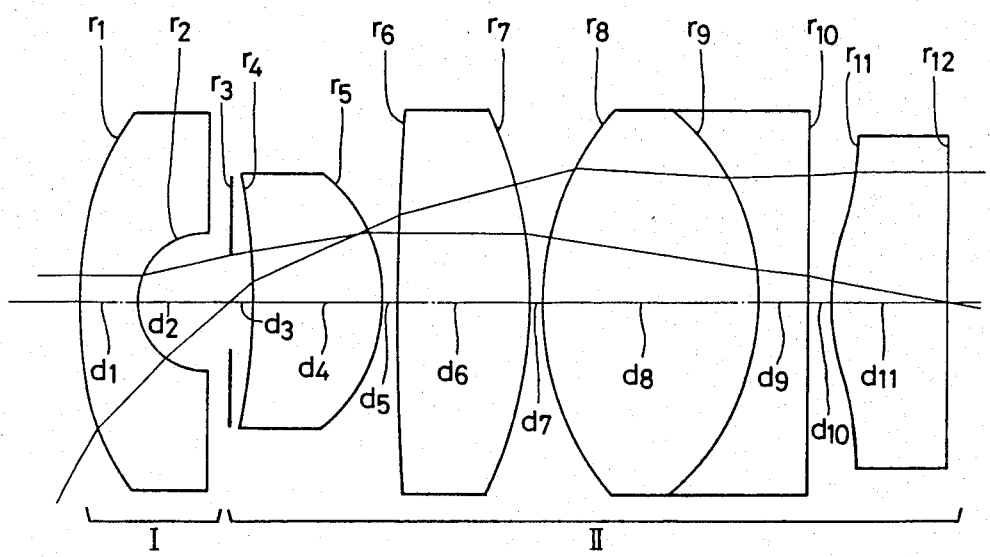
Figure 12:
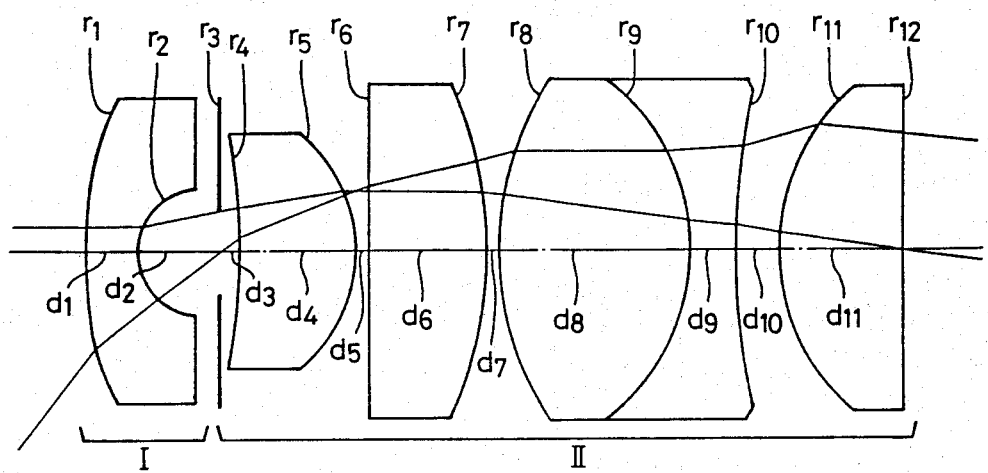

Embodiments 1, 2 and 3 respectively have lens configurations as shon in FIGS. 10, 11 and 12. In other words, each of said embodiments is arranged as a retrofocus-type objective lens system comprising a first lens unit I which comprises a negative meniscus lens component, and a rear lens unit II which comprises a positive meniscus lens component, a positive lens component, a positive cemented doublet, and a positive lens component. Besides, the surface on the object side of the negative meniscus lens component located on the front side of the stop is formed as an aspherical surface, and the surface on the image side of the positive cemented doublet (Embodiments 1 and 3) located on the rear side of the stop or the surface on the object side of the positive lens component (Embodiment 2) located on the rear side of the step is also formed as an aspherical surface.

To correct distortion favourably in said embodiments, it is generally preferable to fulfill the condition (13) shown later.

For the negative lens component located on the front side of the stop, it is preferable to arrange that it comes to a position near the stop in order to make the height of ray low. In that case, to ensure the necessary angle of view, the focal length $f_1$ of said negative lens component should be made small. Therefore, it is preferable to be arranged that $f_1$ fulfills the condition (11) shown below.

$$|f_1| < 2.5f \tag{11}$$

Besides, to make the height of ray low and to make the lens system compact, it is preferably to arrange that the distance D from the surface on the image side of the above-mentioned negative lens component to the foremost surface of the rear lens unit II fulfills the condition (12) shown below.

$$D < 1.8f \tag{12}$$

When the condition (11) or (12) shown in the above is not fulfilled, it is impossible to make the angle of view wide or the diameter of the objective lens system for an endoscope becomes large.

Here, as the value of $|f_1|$ is small as defined by the condition (11), distortion occurs considerably at the negative lens component constituting the front lens unit I. To correct said distortion by means of the aspherical surface, the aspherical surface provided in the front lens unit I or rear lens unit II should be formed as an aspherical surface having a strong function and it is necessary to arrange that the coefficient of aspherical surface E fulfills the condition (13) shown below when p=1 and B=0.

$$|E| > 0.007/f^3 \tag{13}$$

When the condition (13) is not fulfilled, it is difficult to correct distortion.

Besides, to eliminate lateral chromatic aberration, spherical aberration and coma, it is preferable to arrange that the rear lens unit II comprises at least one negative lens. In Embodiments 1, 2 and 3, the lens element on the image side in the positive cemented doublet is arranged as a negative lens.

Figure 13:
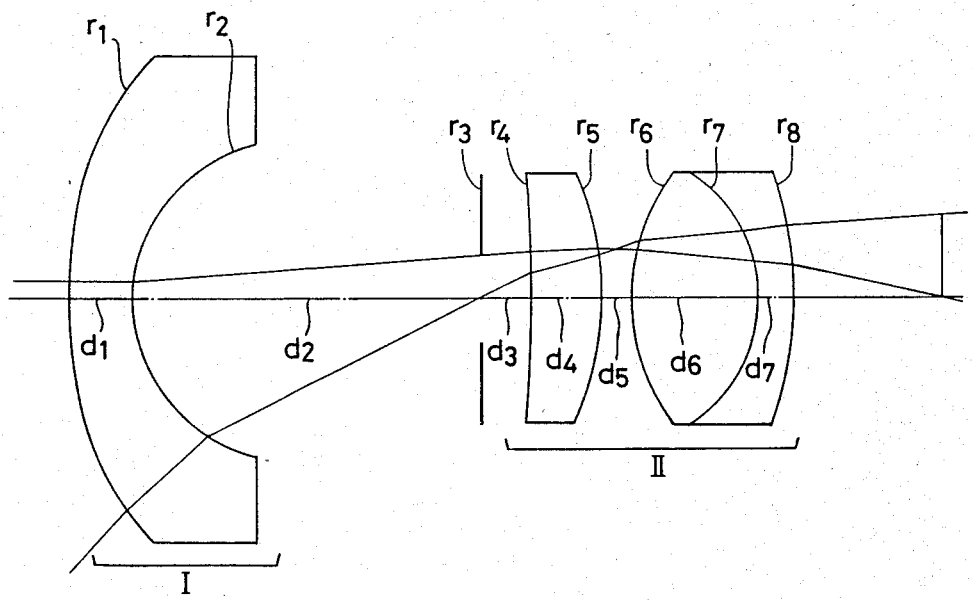
Figure 14:
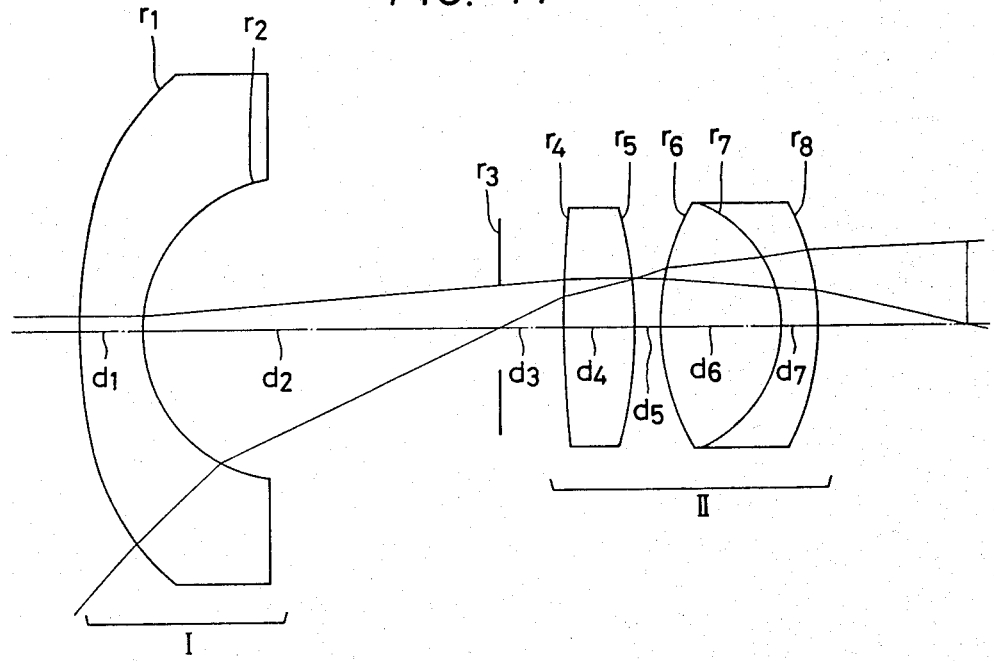
Figure 15:
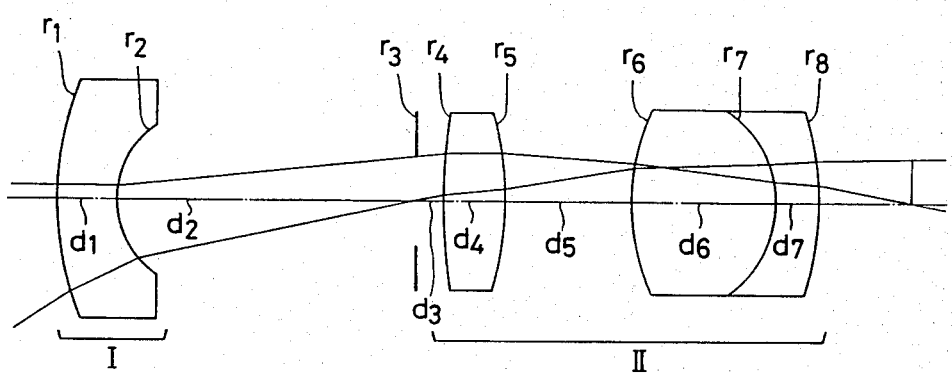

Embodiments 4, 5 and 6 respectively have lens configurations as shown in FIGS. 13, 14 and 15 wherein the front lens unit I comprises a negative meniscus lens component, and the rear lens unit II comprises a positive lens component and a positive cemented doublet. In said embodiments, the surface on the object side of the negative meniscus lens component constituting the front lens unit I is formed as an aspherical surface, and the surface on the object side (Embodiment 6) or on the image side (Embodiments 4 and 5) of the positive cemented doublet constituting the rear lens unit II is also formed as an aspherical surface. Besides, the rear lens unit II is arranged to comprise at least one negative lens (the lens element on the image side of the cemented doublet) in order to thereby eliminate lateral chromatic aberration, spherical aberration and coma.

Embodiments 4, 5 and 6 are arranged that the value of $|f_1|$ is large compared with Embodiment 1, 2 and 3 and is arranged that $|f_1|$ fulfills the condition (14) shown below.

$$|f_1| > 1.8f \quad (14)$$

The condition (14) is established in order to minimize aberrations to be caused by the negative lens component in the front lens unit I, and it is possible to thereby make the number of lenses constituting the lens system small.

To make the angle of view of the lens system large when the condition (14) is fulfilled it is necessary to arrange that the distance D between the front lens unit I and the rear lens unit II fulfills the condition (15) shown below.

$$D > 1.5f \quad (15)$$

When the condition (15) is not fulfilled, the angle of view becomes narrow, and it is inconvenient when the objective lens system is used with an endoscope. Furthermore, as the refractive power of the negative lens component is weak, Petzval's sum becomes large, and it is impossible to correct curvature of field.

To correct distortion of Embodiments 4, 5 and 6 favourably, it is preferable to arrange that either of the aspherical surface provided in the front lens unit I and rear lens unit II fulfills the condition (16) shown below.

$$|E| > 0.001/f^3 \quad (16)$$

When the condition (16) is not fulfilled, large negative distortion remains uncorrected, and this is not desirable for an objective for an endoscope.

Figure 16:
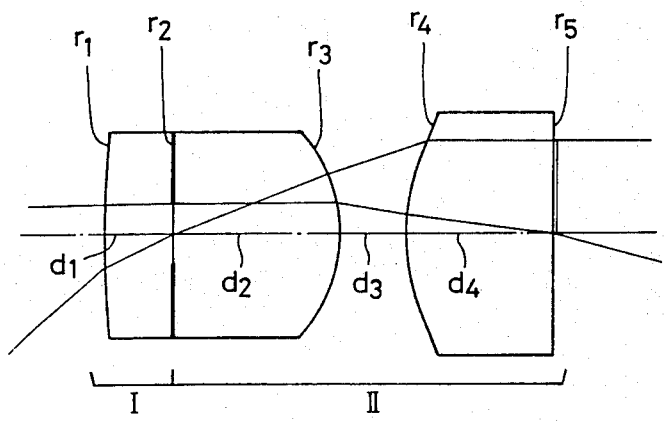

Embodiment 7 has the lens configuration as shown in FIG. 16, i.e., it comprises a positive cemented doublet and a positive lens component, and the stop is provided at the cemented surface of the cemented doublet. Therefore, the lens in front of the cemented surface of the cemented doublet corresponds to, so to speak, the front lens unit I, and the lenses in rear of the cemented surface corresponds to the rear lens unit II.

In Embodiment 7, the first surface and the surface on the object side of the positive lens component (the fourth surface) are arranged as aspherical surfaces. The reason why the surface on the object side of the positive lens component is arranged as an aspherical surface as mentioned in the above is that the height of principal ray on said surface is high and, therefore, it is easy to eliminate distortion and curvature of field by the aspherical surface.

To eliminate distortion, it is preferable to arrange that the aspherical surface provided to the rear lens unit II fulfills the condition (17) shown below.

$$|E| < 0.01/f^3 \quad (17)$$

When the condition (17) shown in the above is not fulfilled, it is impossible to satisfactorily eliminate distortion and curvature of field.

Figure 17:
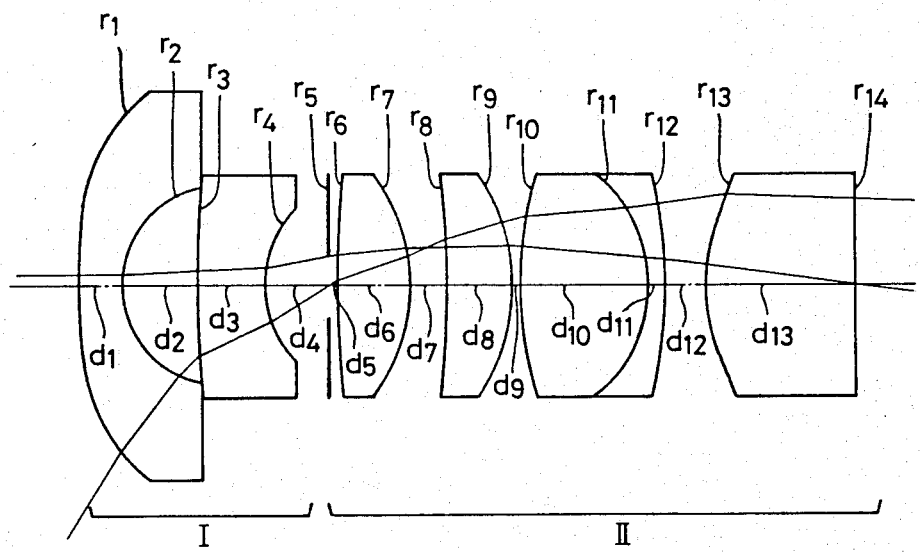
Figure 18:
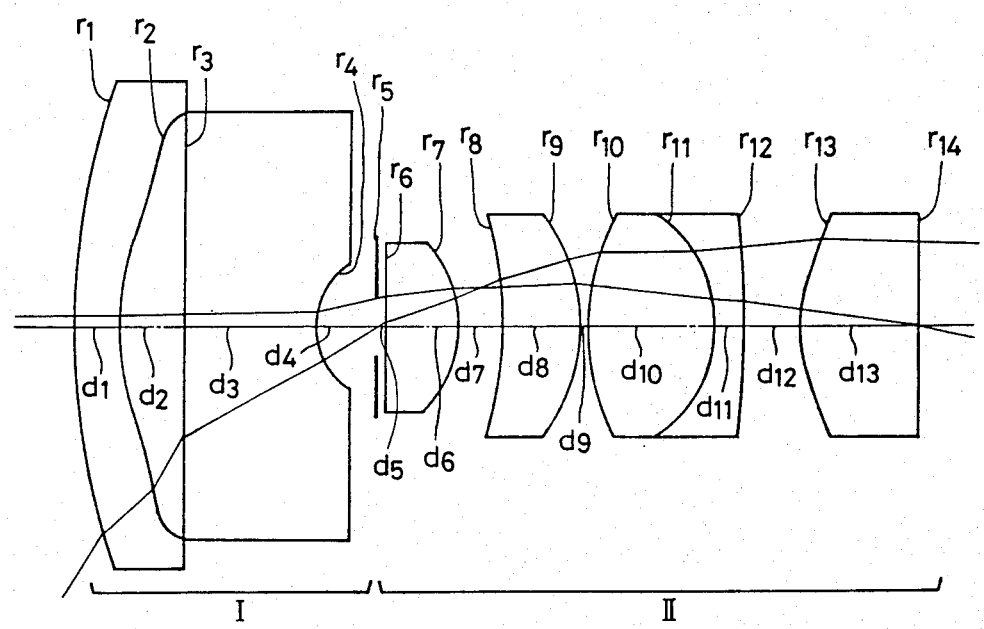
Figure 19:
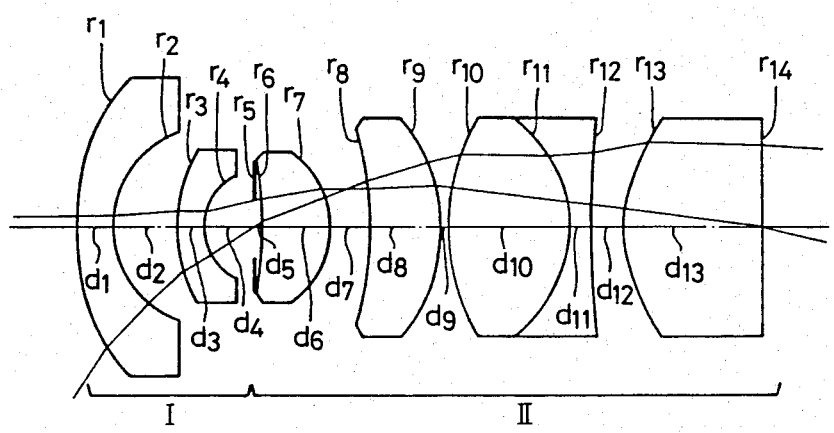
Figure 20:
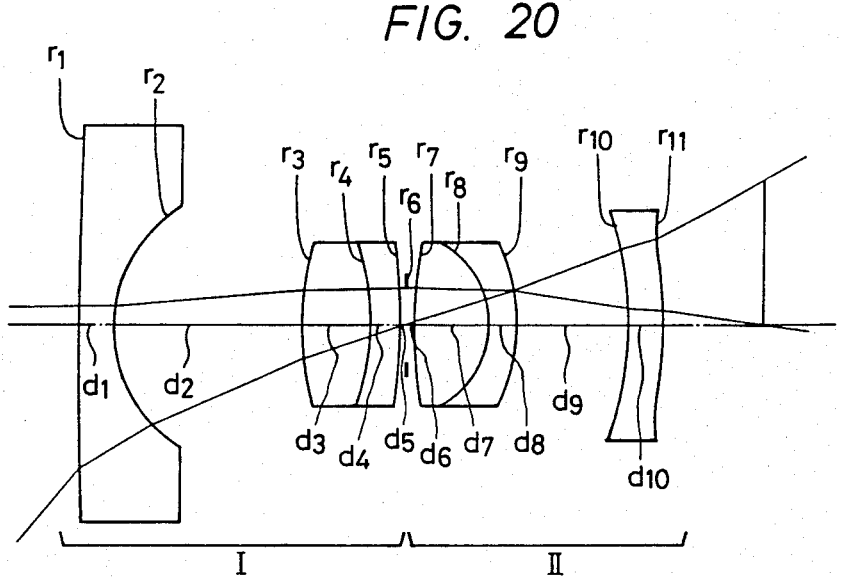
Figure 21:
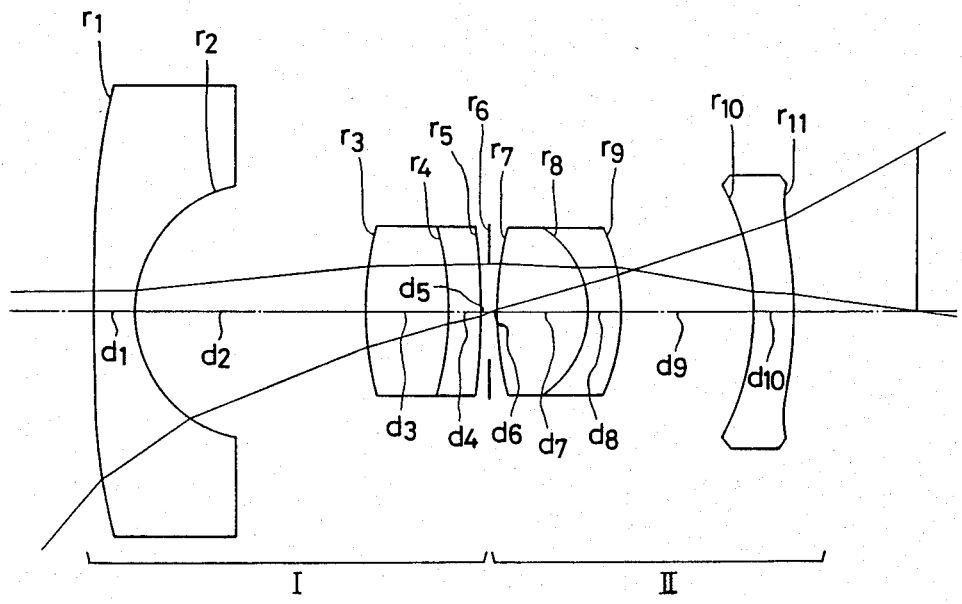
Figure 22:
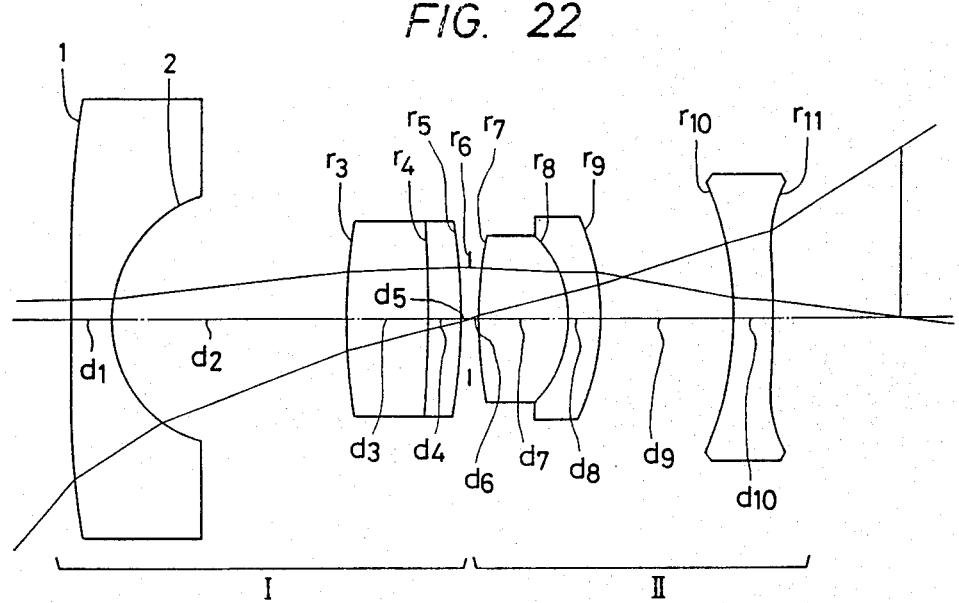
Figure 23:
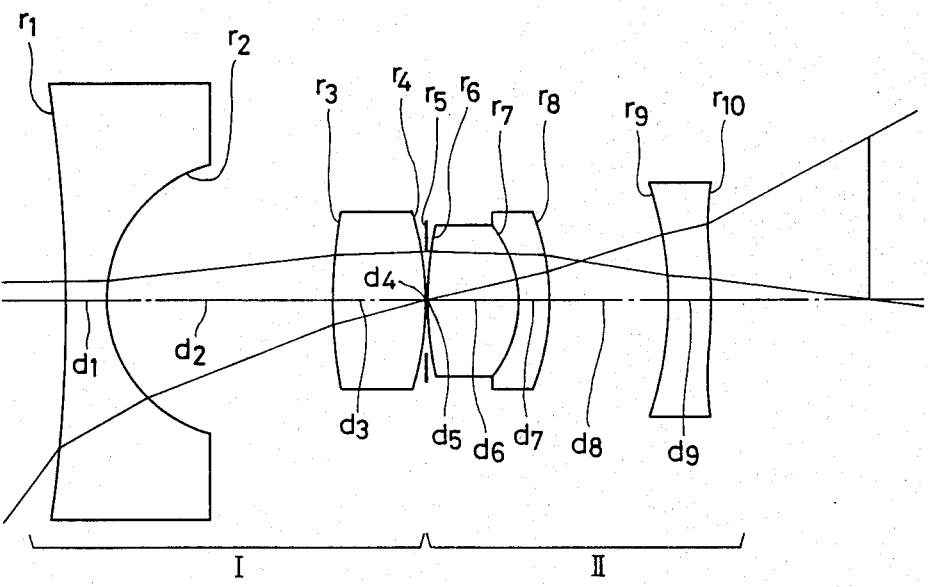
Figure 32:
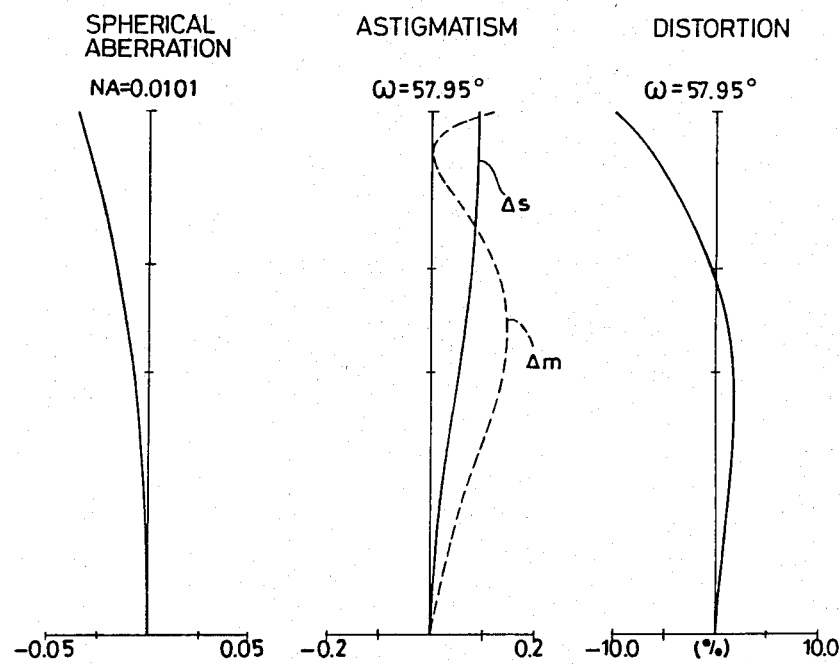
Figure 33:
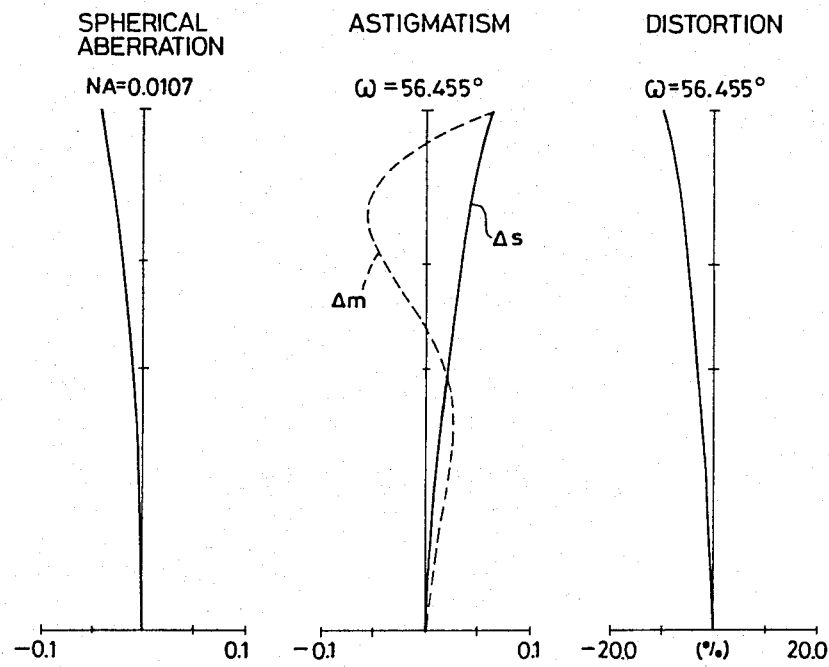
Figure 36:
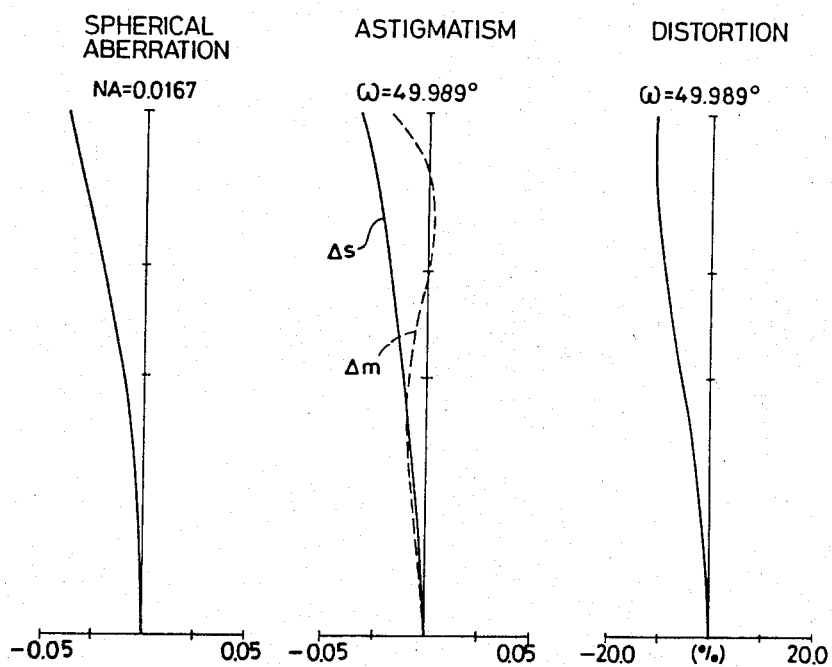
Figure 37:
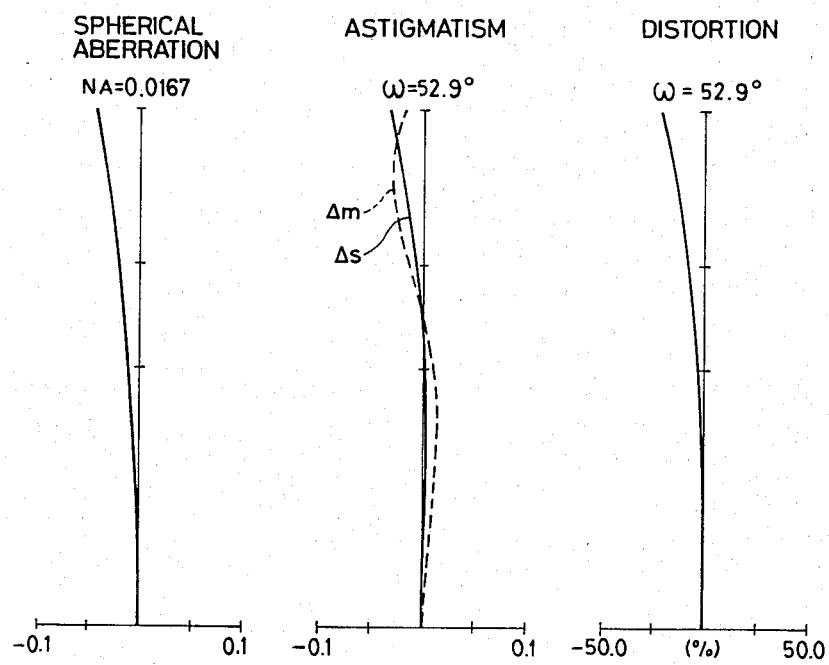

Embodiments 8, 9 and 10 respectively have lens configurations as shown in FIGS. 17, 18 and 19. That is, in each of said embodiments, the front lens unit I comprises two negative lens components, and the rear lens unit II comprises two positive lens components, a positive cemented doublet, and a positive lens component. In said Embodiments 8, 9 and 10, the first surface and the surface on the object side of the positive lens component, which is located at the rearmost position, are arranged as aspherical surfaces. Besides, it is preferable to arrange that the rear lens unit II comprises at least one negative lens in order to correct lateral chromatic aberration, spherical aberration and astigmatism. In said embodiments, the lens element on the image side in the cemented doublet is arranged as a negative lens.

As Embodiments 8, 9 and 10 are respectively arranged that the front lens unit I located in front of the stop comprises two negative lens components, it is possible to make the angle of view wider compared with Embodiments 1, 2 and 3. A feature of Embodiments 8, 9 and 10 is that distortion and coma are small. In cases of these embodiments, heights of rays become high and the lens system as a whole becomes large unless the front lens unit I is arranged to have strong refractive power and is located at a position near the stop. Therefore, it is preferable to arrange that the focal length $f_F$ of the front lens unit I fulfills the condition (18) shown below.

$$|f_F| < 1.8f \quad (18)$$

When the condition (18) is not fulfilled, the diameters of the lenses become large or the angle of view becomes narrow, and this is not desirable.

Besides, it is preferable to arrange that at least one of the aspherical surfaces provided to the front lens unit I and the rear lens unit II fulfills the condition (19) shown below.

$$|E| > 0.001/f \quad (19)$$

When the condition (19) is not fulfilled, correction of distortion becomes insufficient, and negative distortion remains.

Embodiments 11, 12, 13 and 14 respectively have lens configurations as shown in FIGS. 20, 21, 22 and 23. That is, each of said embodiments comprises two positive cemented doublets which are respectively located in front and rear of the stop, a negative lens component located at the foremost position, and a lens component located at the rearmost position.

At least one of the two cemented doublets, which are located in front and rear of the stop, should comprise a negative lens element in order to correct spherical aberration.

For the lens component located at the rearmost position, it is preferable to make the negative refractive power as strong as possible because it is then possible to eliminate distortion. However, if said negative refractive power is made too strong, the angle of principal ray in respect to the optical axis becomes large and, consequently, the intensity of the light in the marginal portion decreases. Therefore, it is preferable to arrange that the focal length $f_4$ of the lens component located at the rearmost position fulfills the condition (20) or (21) shown below.

$$f_4 > 0, \text{ and } f_4 > 5f \quad (20)$$

$$f_4 < 0, \text{ and } |f_4| > 3f \quad (21)$$

When the condition (20) is not fulfilled, large negative distortion remains. When the condition (21) is not fulfilled, the angle of principal ray in respect to the optical axis become large and, consequently, the intensity of light in the marginal portion becomes insufficient.

Besides, to correct distortion favourably, it is preferable to arrange that at least one of the aspherical surfaces provided to the front lens unit I and the rear lens unit II fulfills the condition (22) shown below.

$$|E| > 0.001/f^3 \quad (22)$$

When the condition (22) is not fulfilled, large negative distortion remains.

Furthermore, to correct aberrations more favourably, it is preferable to fulfill the condition (23) shown below.

$$|E_B/E_F| > 2 \quad (23)$$

where, reference symbol $E_F$ represents the aspherical surface coefficient of the fourth power of the aspherical surface provided to the front lens unit I, and reference symbol $E_B$ represents the aspherical surface coefficient of the fourth power of the aspherical surface provided to the rear lens unit II.

When the condition (23) is not fulfilled, meridional curvature of field will be undercorrected.

As described in detail so far and as illustrated by respective embodiments, the objective lens system for an endoscope according to the present invention is arranged, by providing aspherical surfaces in both of the front lens unit and the rear lens unit, that the angle of view is wide and both of distortion and curvature of field are corrected favourably and, at the same time, arranged to be small in size.

We claim:

1. An objective lens system for an endoscope comprising a front lens unit, a rear lens unit, and a stop located between said front and rear lens units, said front lens unit comprising a negative meniscus lens component convex toward the object side arranged that the surface on the object side thereof is formed as an aspherical surface having portions whose curvature is made gradually stronger as they are farther from the optical axis, and said rear lens unit comprising a plurality of lens components including a positive cemented doublet, one of said lens components being arranged so that the surface of the object side thereof is formed as an aspherical surface having portions whose curvature is made gradually weaker as they are farther from the optical axis, the air space between the surface on the extreme image side of said front lens and said stop being constant.

2. An objective lens system for an endoscope according to claim 1, fulfilling the following conditions:

$$A_F \cdot A_R < 0$$

$$0.01 < |A_F/A_R| < 10$$

where, reference symbol $A_F$ represents the sum of coefficients of astigmatism of said aspherical surfaces provided in said front lens unit, and reference symbol $A_R$ represents the sum of coefficients of astigmatism of said aspherical surfaces provided in said rear lens unit.

3. An objective lens system for an endoscope according to claim 2, wherein said front lens unit has negative refractive power, said rear lens unit has positive refractive power and said stop located between said front and rear lens units in the vicinity of the front focal point.

4. An object lens system for an endoscope according to claim 3 wherein said rear lens unit comprises a positive meniscus lens component convex toward the image side, a positive lens component, each of said aspherical surfaces is expressed by the formula shown below when the optical axis is designated as the x axis and a straight line perpendicular to the optical axis and passing the intersecting point between said aspherical surface and optical axis is designated as the y axis and, moreover, each of said aspherical surfaces fulfills the condition shown below:

$$x = \frac{Cy^2}{1 + \sqrt{1 - PC^2 y^2}} + By^2 + Ey^4 + Fy^6 + Gy^8 + \ldots$$

$$|E| > 0.007/f^3$$

where, reference symbol f represents the focal length of the lens system as a whole, reference symbol C represents the inverse number of the radius of curvature of the aspherical surface which is in contact with said aspherical surface on the optical axis, reference symbol P represents a parameter representing the shape of said aspherical surface, and reference symbols B, E, F, G, . . . respectively represent the aspherical surface coefficients of the second power, fourth power, sixth power, eighth power and so on.

5. An objective lens system for an endoscope according to claim 4 further fulfilling the following conditions:

$$|f_1| < 2.5f$$

$$D < 1.8f$$

where, reference symbol $f_1$ represents the focal length of said front lens unit, and reference symbol D represents the distance from the rearmost surface of said front lens unit to the foremost surface of said rear lens unit.

6. An objective lens system for an endoscope according to claim 5 wherein the surface on the object side of said cemented doublet in said rear lens unit is formed as an aspherical surface having portions whose curvature is made gradually weaker as they are farther from the optical axis.

7. An objective lens system for an endoscope according to claim 5 wherein the surface on the object side of said rearmost positive lens component in said rear lens unit is formed as an aspherical surface having portions whose curvature is made gradually weaker as they are farther from the optical axis.

8. An objective lens system for an endoscope according to claim 7 having the following numerical data:

$r_1 = 6.3984$ (aspherical surface)
$d_1 = 0.5595$    $n_1 = 1.51633$    $\nu_1 = 64.15$
$r_2 = 0.6778$
$d_2 = 0.9092$ -continued

| | | |
|---|---|---|
| $r_3 = \infty$ (stop) | | |
| $d_3$ 0.2098 | | |
| $r_4 = 5.5166$ | | |
| $d_4$ 1.2588 | $n_2 = 1.58913$ | $\nu_2 = 61.11$ |
| $r_5 = -1.5634$ | | |
| $d_5 = 0.1399$ | | |
| $r_6 = 29.9814$ | | |
| $d_6 = 1.2588$ | $n_3 = 1.58913$ | $\nu_3 = 61.11$ |
| $r_7 = -4.3416$ | | |
| $d_7 = 0.1399$ | | |
| $r_8 = 2.8491$ | | |
| $d_8 = 2.0980$ | $n_4 = 1.61800$ | $\nu_4 = 63.38$ |
| $r_9 = -2.3590$ | | |
| $d_9 = 0.4755$ | $n_5 = 1.84666$ | $\nu_5 = 23.90$ |
| $r_{10} = -148.8749$ | | |
| $d_{10} = 0.2114$ | | |
| $r_{11} = 1.7587$ (aspherical surface) | | |
| $d_{11} = 1.1277$ | $n_6$ 1.51633 | $\nu_6$ 64.15 |
| $r_{12} = \infty$ | | |
| $f = 1, 2\omega = 119.986°$ | | |
| aspherical surface coefficient of 1st surface | | |
| $P = .1, E = 0.35094 \times 10^{-1}$ | | |
| $F = -0.35734 \times 10^{-2}$ | | |
| aspherical surface coefficient of 11th surface | | |
| $P = 1, E = -0.11938$ | | |
| $F = 0.11557 \times 10^{-2}$ | | |
| $A_F = -0.01539, A_R = 0.04461$ | | |
| $A_F/A_R = -0.34499$ | | |
| $f_1 = -1.519, D_1 = 1.119$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lens, reference symbols $n_1, n_2, \ldots$ respectively represent refractive indices of respective lenses, and reference symbols $\nu_1, \nu_2, \ldots$ respectively represent Abbe's numbers of respective lenses.

9. An objective lens system for an endoscope according to claim 8 wherein said front lens unit comprises two negative lens components each having a concave surface on the image side, said rear lens unit comprises a positive lens component, a positive lens component, a positive cemented doublet, and a positive lens component having a convex surface on the object side, each of said aspherical surfaces is expressed by the formula shown below when the optical axis is designated as the x axis and a straight line perpendicular to the optical axis and passing the intersecting point between said aspherical surface and optical axis is designated as the y axis and, moreover, each of said a spherical surfaces fulfills the conditions shown below:

$$x = \frac{Cy^2}{1 + \sqrt{1 - PC^2y^2}} + By^2 + Ey^4 + Fy^6 + Gy^8 + \ldots$$

$$|f_F| < \cdot 1.8f$$

$$|E| < 0.001/f^3$$

where, reference symbol $f_F$ represents the focal length of said front lens group, reference symbol f represents the focal length of the lens system as a whole, reference symbol C represents the inverse number of the radius of curvature of the spherical surface which is in contact with said aspherical surface on the optical axis, reference symbol P represents a parameter representing the shape of said aspherical surface, and reference symbols B, E, F, G, ... respectively represent the aspherical surface coefficients of the second power, fourth power, sixth power eighth power and so on.

10. An objective lens system for an endoscope according to claim 9 wherein the surface on the object side of said rearmost positive lens component in said rear lens unit is formed as an aspherical surface having portions whose curvature is made gradually weaker as they are farther from the optical axis.

11. An objective lens system for an endoscope according to claim 10 having the following numerical data:

| | | |
|---|---|---|
| $r_1 = 16.1623$ (aspherical surface) | | |
| $d_1 = 0.7273$ | $n_1 = 1.49109$ | $\nu_1 = 57.00$ |
| $r_2 = 1.6598$ | | |
| $d_2 = 1.2510$ | | |
| $r_3 = 19.6061$ | | |
| $d_3 = 1.1736$ | $n_2 = 1.78800$ | $\nu_2 = 47.43$ |
| $r_4 = 1.9317$ | | |
| $d_4 = 1.0628$ | | |
| $r_5 = \infty$ (stop) | | |
| $d_5 = 0.1119$ | | |
| $r_6 = 14.1042$ | | |
| $d_6 = 1.2096$ | $n_3 = 1.58913$ | $\nu_3 = 60.97$ |
| $r_7 = -2.9033$ | | |
| $d_7 = 0.6212$ | | |
| $r_8 = -17.7424$ | | |
| $d_8 = 1.1115$ | $n_4 = 1.58913$ | $\nu_4 = 60.97$ |
| $r_9 = -3.1102$ | | |
| $d_9 = 0.1372$ | | |
| $r_{10} = 6.4185$ | | |
| $d_{10} = 2.1674$ | $n_5 = 1.61800$ | $\nu_5 = 63.38$ |
| $r_{11} = -2.2840$ | | |
| $d_{11} = 0.2467$ | $n_6 = 1.84666$ | $\nu_6 = 23.90$ |
| $r_{12} = -8.1806$ | | |
| $d_{12} = 0.6832$ | | |
| $r_{13} = 2.5389$ (aspherical surface) | | |
| $d_{13} = 2.5050$ | $n_7 = 1.49109$ | $\nu_7 = 57.00$ |
| $r_{14} = \infty$ | | |
| $f = 1, 2\omega = 116.002°$ | | |
| aspherical surface coefficient of 1st surface | | |
| $P = 1, E = 0.79514 \times 10^{-2}, F = 0$ | | |
| aspherical surface coefficient of 13th surface | | |
| $P = 1, E = 0.79514 \times 10^{-2}, F = 0$ | | |
| $A_F = -0.01083, A_R = -0.03888$ | | |
| $A_F/A_R = -0.27855, f_F = -1.251$ | | | where, reference symbols $r_1, r_2, \ldots$ respectively represent radii of curvature of respective lens surfaces, reference symbols $d_1, d_2, \ldots$ respectively thicknesses of respective lenses and airspaces between respective lens, reference symbols $n_1, n_2, \ldots$ respectively represent refractive indices of respective lenses, and reference symbols $\nu_1, \nu_2, \ldots$ respectively represent Abbe's numbers of respective lenses.

12. An objective lens system for an endoscope according to claim 10 having the following numerical data:

| | | |
|---|---|---|
| $r_1 = 5.8227$ (aspherical surface) | | |
| $d_1 = 0.6155$ | $n_1 = 1.88300$ | $\nu_1 = 40.78$ |
| $r_2 = 1.7026$ | | |
| $d_2 = 1.0434$ | | |
| $r_3 = 2.3876$ | | |
| $d_3 = 0.4505$ | $n_2 = 1.78800$ | $\nu_2 = 47.43$ |
| $r_4 = 0.9653$ | | |
| $d_4 = 0.8366$ | | |
| $r_5 = \infty$ (stop) | | |
| $d_5 = 0.122$ | | |
| $r_6 = -7.1626$ | | |
| $d_6 = 1.1660$ | $n_3 = 1.58913$ | $\nu_3 = 60.97$ |
| $r_7 = -1.5456$ | | |
| $d_7 = 0.6796$ | | |
| $r_8 = -5.6290$ | | |
| $d_8 = 1.1942$ | $n_4 = 1.58913$ | $\nu_4 = 60.97$ |
| $r_9 = -2.7189$ | | |
| $d_9 = 0.1287$ | | |
| $r_{10} = 3.58785$ | | |

-continued

| | | |
|---|---|---|
| $d_{10} = 2.0335$ | $n_5 = 1.61800$ | $\nu_5 = 63.38$ |
| $r_{11} = -2.1429$ | | |
| $d_{11} = 0.3520$ | $n_6 = 1.84666$ | $\nu_6 = 23.90$ |
| $r_{12} = 20.9041$ | | |
| $d_{12} = 0.5519$ | | |
| $r_{13} = 2.1991$ (aspherical surface) | | |
| $d_{13} = 2.2863$ | $n_7 = 1.49109$ | $\nu_7 = 57.00$ |
| $r_{14} = \infty$ | | |

$f = 1, 2\omega = 112.91°$
aspherical surface coefficient of 1st surface
$P = 1, E = 0.96277 \times 10^{-2}, F = 0$
aspherical surface coefficient of 13th surface
$P = 1, E = -0.32235 \times 10^{-1}, F = 0$
$A_F = -0.01292, A_R = 0.03088$
$A_F/A_R = -0.41389, f_F = -1.044$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, n_2, \ldots$ respectively represent Abbe's numbers of respective lenses.

13. An objective lens system for an endoscope according to claim 1, wherein a meniscus lens component concave toward the image side is arranged on the extreme object side of said front lens unit, a meniscus lens component concave toward the object side is arranged on the extreme image side of said rear lens unit, a positive lens component is arranged on the extreme image side of said front lens unit, a positive lens component is arranged on the extreme object said of said rear lens units, and a stop is arranged between said positive lenses arranged in front lens unit and rear lens unit.

14. An objective lens system for an endoscope according to claim 13 wherein said front lens unit comprises a negative lens component having a concave surface on the image side, and a positive cemented doublet, said rear lens group comprises a positive cemented doublet, and a meniscus lens component convex toward the image side, each of said aspherical surfaces is expressed by the formula shown below when the optical axis is designated as the x axis and a straight line perpendicular to the optical axis and passing the intersecting point between said aspherical surface and optical axis is designated as the y axis and, each of said aspherical surfaces fulfills the condition shown below:

$$x = \frac{Cy^2}{1 + \sqrt{1 - PC^2y^2}} + By^2 + Ey^4 + Fy^6 + Gy^8 + \ldots$$

$$|E| > 0.0001/f^3$$

where, reference symbol f represents the focal length of the lens system as a whole, reference symbol C represents the inverse number of the radius of curvature of the spherical surface which is in contact with said aspherical surface on the optical axis, reference symbol P represents a parameter representing the shape of said aspherical surface, and reference symbols B, E, F, G, respecively represent the aspherical coefficients of the second power, fourth power, sixth power, eighth power and so on.

15. An objective lens system for an endoscope comprising a front lens unit, a rear lens unit, and a stop located between said front and rear units, said front lens unit comprising a negative lens component concave toward the image side arranged so that the surface on the object side thereof is formed as an aspherical surface having portions whose curvature is made gradually stronger as they are farther from the optical axis, and said rear lens unit comprising a plurality of lens components including a positive cemented doublet one of said lens components being arranged so that the surface on the image side thereof is formed as an aspherical surface having portions whose curvature is made gradually stronger as they are farther from the optical axis, the air space between the surface on the extreme image side of said front lens unit and said stop being constant.

16. An objective lens system for an endoscope according to claim 15 fulfilling the following conditions:

$$A_F \cdot A_R < 0$$

$$0.01 < |A_F/A_R| < 10$$

where, reference symbol $A_F$ represents the sum of coefficients of astigmatism of said aspherical surfaces provided in said front lens unit, and reference symbol $A_R$ represents the sum of coefficients of astigmatism of said aspherical surfaces provided in said rear lens unit.

17. An objective lens system for an endoscope according to claim 16, wherein said front lens unit has negative refractive power, said rear lens unit has positive refractive power and said stop located between said front and rear lens unit in the vicinity of the front focal point.

18. An objective lens system for an endoscope according to claim 17 wherein said negative lens component in said front lens unit is a negative meniscus lens convex toward the object side, said rear lens unit comprises a positive meniscus lens component convex toward the image side, a positive lens component, a positive cemented doublet, and a positive lens component, each of said aspherical surfaces is expressed by the formula shown below when the optical axis is designed as the x axis and a straight line perpendicular to the optical axis and passing the intersecting point between said aspherical surface and optical axis is designated as the y axis and, moreover, each of said aspherical surfaces fulfills the condition shown below.

$$x = \frac{Cy^2}{1 + \sqrt{1 - PC^2y^2}} + By^2 + Ey^4 + Fy^6 + Gy^8 + \ldots$$

$$|E| > 0.007/f^3$$

where, reference symbol f represents the focal length of the lens system as a whole, reference symbol C represents the inverse number of the radius of curvature of the aspherical surface which is in contact with said aspherical surface on the optical axis, reference symbol P represents a parameter representing the shape of said aspherical surface, and reference symbols B, E, F, G, . . . respectively represent the aspherical surface coefficients of the second power, fourth power, sixth power, eighth power and so on.

19. An objective lens system for an endoscope according to claim 18 fulfilling the following conditions:

$$|f_1| < 2.5f$$

$$D < 1.8f$$

where, reference symbol $f_1$ represents the focal length of said front lens unit, and reference symbol d represents the distance from the rearmost surface of said front lens unit to the foremost surface of said rear lens unit.

20. An objective lens system for an endoscope according to claim 19 wherein the surface on the image side of said cemented doublet in said rear lens unit is formed as an aspherical surface having portions whose curvature is made gradually stronger as they are farther from the optical axis.

21. An objective lens system for an endoscope according to claim 20 having the following numerical data:

---

$r_1 = 6.1180$ (aspherical surface)
$d_1 = 0.5298$  $n_1 = 1.51633$  $\nu_1 = 64.15$
$r_2\ 0.6522$
$d_2 = 0.8609$
$r_3 = \infty$ (stop)
$d_3 = 0.1987$
$r_4 = -5.6100$
$d_4 = 1.1921$  $n_2 = 1.58913$  $\nu_2 = 61.11$
$r_5 = -1.4817$
$d_5 = 0.1325$
$r_6 = 197.8841$
$d_6 = 1.1921$  $n_3 = 1.58913$  $\nu_3 = 61.11$
$r_7 = -4.2546$
$d_7 = 0.1325$
$r_8 = 2.4509$
$d_8 = 1.9868$  $n_4\ 1.61800$  $\nu_4 = 63.88$
$r_9 = -2.4826$
$d_9 = 0.4503$  $n_5 = 1.84666$  $\nu_5 = 23.90$
$r_{10} = -50.0313$ (aspherical surface)
$d_{10} = 0.2181$
$r_{11} = 2.5823$
$d_{11} = 1.0680$  $n_6 = 1.51633$  $\nu_6 = 64.15$
$r_{12} = \infty$
$f = 1, 2\omega = 105.004°$
aspherical surface coefficient of 1st surface
$P = 1, E = 0.58449 \times 10^{-1}$
$F = -0.2063f3 \times 10^{-2}$
aspherical surface coefficient of 10th surface
$P = 1, E = 0.49349 \times 10^{-1}$
$F = 0.11654 \times 10^{-1}$
$A_F = -0.01847, A_R = 0.0294$
$A_F/A_R = -.062823$
$f_1 = -1.462, D_1 = 1.06$

--- where, reference symbols $r_1, r_2, \ldots$ respectively represent radii of curvature of respective lens surfaces, references symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

22. An objective lens system for an endoscope according to claim 20 having the following numerical data:

---

$r_1 = 4.2490$ (aspherical surface)
$d_1 = 0.4310$  $n_1\ 1.51633$  $\nu_1 = 64.15$
$r_2 = 0.5336$
$d_2 = 0.7004$
$r_3 = \infty$ (stop)
$d_3 = 0.1616$
$r_4 = -5.1135$
$d_4 = 0.9698$  $n_2\ 1.58913$  $\nu_2 = 61.11$
$r_5 = -1.1946$
$d_5 = 0.1078$
$r_6 = 431.8244$
$d_6 = 0.9698$  $n_3 = 1.58913$  $\nu_3 = 61.11$
$r_7 = -3.3672$
$d_7 = 0.1078$
$r_8 = 2.4551$
$d_8 = 1.6164$  $n_4 = 1.61800$  $\nu_4 = 63.38$
$r_9 = -1.6551$
$d_9 = 0.3664$  $n_5\ 1.84666$  $\nu_5 = 23.90$
$r_{10} = 10.7060$ (aspherical surface)
$d_{10} = 0.3668$
$r_{11} = 1.7661$
$d_{11}\ 1.0237$  $n_6 = 1.51633$  $\nu_6 = 64.15$
$r_{12} = \infty$
$f = 1, 2\omega = 104.908°$
aspherical surface coefficient of 1st surface
$P = 1, E = 0.38819 \times 10^{-1}$
$F = -0.23129 \times 10^{-2}$
aspherical surface coefficient of 10th surface
$P = 1, E = 0.42299 \times 10^{-1}$
$F = -0.15892 \times 10^{-1}$
$A_F = -0.00364, A_R = 0.00995$
$A_F/A_R = -0.36583$
$f_1 = -1.231, D_1 = 0.862$

--- where, reference symbols $r_1, r_2, \ldots$ respectively represent radii of curvature of respective lens surfaces, reference symbols $d_1, d_2, \ldots$ respectively represent thickness of respective lenses and airspaces between respective lenses, reference symbols $n_1, n_2, \ldots$ respectively represent refractive indices of respective lenses, and reference symbols $\nu_1, \nu_2, \ldots$ respectively Abbe's numbers of respective lenses.

23. An objective lens system for an endoscope according to claim 17 wherein said negative lens component in said front lens unit is a negative meniscus lens convex toward the object side, said rear lens unit comprises a positive lens component, and a cemented doublet, each of said aspherical surfaces is expressed by the formula shown below when the optical axis is designed as the x axis and a straight line perpendicular to the optical axis and passing the intersecting point between said aspherical surface and optical axis is designated as the y axis and, moreover, each of said aspherical surfaces fulfills the condition shown below:

$$x = \frac{Cy^2}{1 + \sqrt{1 - PC^2y^2}} + By^2 + Ey^4 + Fy^6 + Gy^8 + \ldots$$

$$|E| > 0.001/f^3$$

where, reference symbol f represents the focal length of the lens system as a whole, reference symbol C represents the inverse number of the radius of curvature of the spherical surface which is in contact with said aspherical surface on the optical axis, reference symbol P represents a parameter representing the shape of said aspherical surface, and reference symbols B, E, F, G, . . . respectively represent the aspherical surface coefficients of the second power, fourth power, sixth power, eighth power and so on.

24. An objective lens system for an endoscope according to claim 23 further fulfilling the following conditions:

$$|f_1| > 1.8f$$

$$D > 1.5f$$

where, reference symbol $f_1$ represents the focal length of said front lens unit, and reference symbol D represents the distance from the rearmost surface of said front lens unit to the foremost surface of said rear lens unit.

25. An objective lens system for an endoscope according to claim 24 wherein the surface on the image side of said cemented doublet in said rear lens is formed as an aspherical surface having portions whose curvature is made gradually stronger as they are farther from the optical axis.

26. An objective lens system for an endoscope according to claim 25 having the following numerical data:

```
r1 = 6.8768 (aspherical surface)
d1 = 0.7795      n1 = 1.88300     ν1 = 40.78
r2 = 1.9045
d2 = 4.2438
r3 = ∞ (stop)
d3 = 0.6058
r4 = -18.35668
d4 = 0.8762      n2 = 1.69680     ν2 = 55.52
r5 = -3.5516
d5 = 0.3341
r6 = 2.4922
d6 = 1.5367      n3 = 1.64000     ν3 = 60.09
r7 = -1.7814
d7 0.4454        n4 = 1.84666     ν4 = 23.88
r8 = -3.4576 (aspherical surface)
f 1, 2ω = 95.0°
aspherical surface coefficient of 1st surface
P = 1, E = 0.63687 × 10⁻²
F = -0.12992 × 10⁻³
aspherical surface coefficient of 8th surface
P = 1, E = 0.22882 × 10⁻¹
F = -0.38644ν × 10⁻²
A_F = -.00116, A_R = 0.01893
A_F/A_R = -0.06128
f1 = -3.22, D1 = 4.85
``` where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

27. An objective lens system for an endoscope according to claim 25 having the following numerical data:

```
r1 = 9.3756 (aspherical surface)
d1 = 0.8621      n1 = 1.88300     ν1 = 40.78
r2 = 2.0517
d2 = 4.8958
r3 = ∞ (stop)
d3 = 0.8554
r4 = 15.9800
d4 0.9690        n2 = 1.69680     ν2 = 55.52
r5 = -5.9752
d5 = 0.3695
r6 = 3.4698
d6 = 1.6374      n3 = 1.64000     ν3 = 60.09
r7 = -1.7857
d7 = 0.4926      n4 = 1.84666     ν4 = 23.88
r8 = -2.9875 (aspherical surface)
f = 1, 2ω = 94.424°
aspherical surface coefficient of 1st surface
P = 1, E = 0.41954 × 10⁻²
F = 0.52825 × 10⁻⁴
aspherical surface coefficient of 8th surface
P = 1, E = 0.18885 × 10⁻¹
F = -0.24735 × 10⁻²
A_F = -0.00001, A_r = 0.00003
A_F/A_R = -0.33333
f1 = -3.148, D1 = 5.751
``` where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, references symbols $n_1, n_2, \ldots$ respectively represent refractive indices of respective lenses, and reference symbols $\nu_1, \nu_2, \ldots$ respectively represent Abbe's numbers of respective lenses.

28. An objective lens system for an endoscope according to claim 17 wherein said front lens unit comprises two negative lens components each having a concave surface on the image side, said rear lens unit comprises a positive lens component, a positive lens component, a positive cemented doublet, and a positive lens component having a convex surface on the object side, each of said aspherical surfaces is expressed by the formula shown below when the optical axis is designated as the x axis and a straight line perpendicular to the optical axis and passing the intersecting point between said aspherical surface and optical axis is designated as the y axis and, moreover, each of said aspherical surfaces fulfills the conditions shown below:

$$x = \frac{Cy^2}{1 + \sqrt{1 - PC^2y^2}} + By^2 + Ey^4 + Fy^6 + Gy^8 + \ldots$$

$$|f_F| < \cdot 1.8f$$

$$|E| < 0.001/f^3$$

where, reference symbol $f_F$ represents the focal length of said front lens group, reference symbol f represents the focal length of the lens system as a whole, reference C represents the inverse number of the radius of curvature of the spherical surface which is in contact with said aspherical surface on the optical axis, reference symbol P represents a parameter representing the shape of said aspherical surface, said reference symbols B, E, F, G, ... respectively represent the aspherical surface coefficients of the second power, fourth power, sixth power eighth power and so on.

29. An objective lens system for an endoscope according to claim 16, wherein a meniscus lens component concave toward the image side is arranged on the extreme object side of said front lens unit, a meniscus lens component concave toward the object side is arranged on the extreme image side of said rear lens unit, a positive lens component is arranged on the extreme image side of said front lens unit, a positive lens component is arranged on the extreme object side of said rear lens unit, and stop is arranged between said positive lenses arranged in the front lens unit and rear lens unit.

30. An objective lens system for an endoscope according to claim 29 wherein said front lens unit comprises a negative lens component having a concave surface on the image side, and a positive cemented doublet, said rear lens group comprises a positive cemented doublet, and a meniscus lens component convex toward the image side, each of said aspherical surfaces is expressed by the formula shown below when the optical axis is designated as the x axis and a straight line perpendicular to the optical axis and passing the intersecting point between said aspherical surface and optical axis is designated as the y axis and, moreover, each of said spherical surfaces fulfills the condition shown below:

$$x + \frac{Cy^2}{1 + \sqrt{1 - PC^2y^2}} + By^2 + Ey^4Fy^6 + Gy^8 + \ldots$$

$$|E| > 0.001/f^3$$

where, reference symbol f represents the focal length of the lens system as a whole, reference symbol C represents the inverse number of the radius of curvature of the spherical surface which is in contact with said aspherical surface on the optical axis, reference symbol P represents a parameter representing the shape of said aspherical surface, and reference symbols B, E, F, G, . . . respectively represent the aspherical the aspherical surface coefficients of the second power, fourth power, sixth power, eighth power and so on.

31. An objective lens system for an endoscope according to claim 30 wherein the surface on the image side of said meniscus lens component in said rear lens unit is formed as an aspherical surface having portions whose curvature is made gradually stronger as they are farther from the optical axis.

32. An objective lens system for an endoscope according to claim 31 further fulfilling the following condition:

$$f_4 < 5f$$

where, reference symbol $f_4$ represents the focal length of said meniscus lens component constituting said rear lens unit.

33. An objective lens system for an endoscope according to claim 31 further fulfilling the following condition:

$$f_4 < -3f$$

where, reference symbol $f_4$ represents the focal length of said meniscus lens component constituting said rear lens unit.

34. An objective lens system for an endoscope according to claim 32 having the following numerical data:

| | | |
|---|---|---|
| $r_1 = \infty$ (aspherical surface) | | |
| $d_1 = 0.2681$ | $n_1 = 1.51633$ | $\nu_1 = 64.15$ |
| $r_2 = 1.0400$ | | |
| $d_2 = 1.4189$ | | |
| $r_3 = 2.1359$ | | |
| $d_3 = 0.5362$ | $n_2 = 1.59270$ | $\nu_2 = 35.29$ |
| $r_4 = -1.5405$ | | |
| $d_4 = 0.2145$ | $n_3 = 1.83400$ | $\nu_3 = 37.16$ |
| $r_5 = -3.9303$ | | |
| $d_5 = 0.0536$ | | |
| $r_6 = \infty$ (stop) | | |
| $d_6 = 0.0536$ | | |
| $r_7 = 3.1352$ | | |
| $d_7 = 0.5898$ | $n_4 = 1.62041$ | $\nu_4 = 60.27$ |
| $r_8 = -0.6278$ | | |
| $d_8 = 0.2145$ | $n_5 = 1.80518$ | $\nu_5 = 25.43$ |
| $r_9 = -1.2322$ | | |
| $d_9 = 0.8609$ | | |
| $r_{10} = -2.2697$ | | |
| $d_{10} = 0.2681$ | $n_6 = 1.84666$ | $\nu_6 = 23.88$ |
| $r_{11} = -1.9100$ (aspherical surface) | | |
| $f = 1, 2\omega = 100.0°$ | | |
| aspherical surface coefficient of 1st surface | | |
| $P = 1, E = 0.39752 \times 10^{-2}$ | | |
| aspherical surface coefficient of 11th surface | | |
| $P = 1, E = 0.25509$ | | |
| $A_F = -.00044, A_R = 0.01371$ | | |
| $A_F/A_R = -0.03209, E_F = 0-.003975$ | | |
| $E_B = 0.25509, E_B/E_F = 64.17$ | | |
| $f_4 = 10.608$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbol $n_1, n_2, \ldots$ respectively represent refractive indices of respective lenses, and reference symbols $\nu_1, \nu_2, \ldots$ respectively represent Abbe's numbers of respective lenses.

35. An objective lens system for an endoscope according to claim 32 having the following numerical data:

| | | |
|---|---|---|
| $r_1 = \infty$ (aspherical surface) | | |
| $d_1 = 0.2772$ | $n_1 = 1.51633$ | $\nu_1 = 64.15$ |
| $r_2 = 0.8565$ | | |
| $d_2 = 1.5573$ | | |
| $r_3 = 2.4166$ | | |
| $d_3 = 0.5543$ | $n_2 = 1.59270$ | $\nu_2 = 35.29$ |
| $r_4 = -2.1023$ | | |
| $d_4 = 0.2217$ | $n_3 = 1.83400$ | $\nu_3 = 37.16$ |
| $r_5 = -3.7245$ | | |
| $d_5 = 0.0554$ | | |
| $r_6 = \infty$ (stop) | | |
| $d_6 = 0.0554$ | | |
| $r_7 = 3.1854$ | | |
| $d_7 = 0.6098$ | $n_4 = 1.62041$ | $\nu_4 = 60.27$ |
| $r_8 = -0.6391$ | | |
| $d_8 = 0.2217$ | $n_5 = 1.80518$ | $\nu_5 = 25.43$ |
| $r_9 = -1.2642$ | | |
| $d_9 = 0.8900$ | | |
| $r_{10} = -1.7084$ | | |
| $d_{10} = 0.2772$ | $n_6 = 1.84666$ | $\nu_6 = 23.88$ |
| $r_{11} = -2.1791$ (aspherical surface) | | |
| $f = 1, 2\omega = 50.006°$ | | |
| aspherical surface coefficient of 1st surface | | |
| $P = 1, E = 0.25013 \times 10^{-1}$ | | |
| aspherical surface coefficient of 11th surface | | |
| $P = 1, E = 0.11723, F = 0.11906$ | | |
| $A_F = -0.00283, A_R = 0.00718$ | | |
| $A_F/A_F = -0.39415, E_F = 0.02501$ | | |
| $E_B = 0.1172, E_B/E_R = 4.686$ | | |
| $f_4 = -12.795$ | | | where, reference symbols $r_1, r_2, \ldots$ respectively represent radii of curvature of respective lens surfaces, reference symbol $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

36. An objective lens system for an endoscope according to claim 32 having the following numerical data:

| | | |
|---|---|---|
| $r_1 = \infty$ (aspherical surface) | | |
| $d_1 = 0.2743$ | $n_1 = 1.51633$ | $\nu_1 = 64.15$ |
| $r_2 = 0.8373$ | | |
| $d_2 = 1.5683$ | | |
| $r_3 = 4.2174$ | | |
| $d_3 = 0.5485$ | $n_2 = 1.59270$ | $\nu_2 = 35.29$ |
| $r_4 = -10.5058$ | | |
| $d_4 = 0.2194$ | $n_3 = 1.83400$ | $\nu_3 = 37.16$ |
| $r_5 = -3.4706$ | | |
| $d_5 = 0.0549$ | | |
| $r_6 = \infty$ (stop) | | |
| $d_6 = 0.0549$ | | |
| $r_7 = 2.6304$ | | |
| $d_7 = 0.6034$ | $n_4 = 1.62041$ | $\nu_4 = 60.27$ |
| $r_8 = -0.7752$ | | |
| $d_8 = 0.2194$ | $n_5 = 1.80518$ | $\nu_5 = 25.43$ |
| $r_9 = -1.4995$ | | |
| $d_9 = 0.8795$ | | |
| $r_{10} = -2.2103$ | | |
| $d_{10} = 0.2743$ | $n_6 = 1.84666$ | $\nu_6 = 23.88$ |
| $r_{11} = -4.1560$ (aspherical surface) | | |
| $f = 1, 2\delta = 99.978°$ | | |
| aspherical surface coefficient of 1st surface | | |
| $P = 1, E = 0.15461 \times 10^{-1}$ | | |
| $F = 0.13610 \times 10^{-2}$ | | |
| aspherical surface coefficient of 11th surface | | |

```
P = 1, E = 0.14239, F = 0.19039
A_F = -0.00158, A_R = 0.00701
A_F/A_F = -0.22539, E_F = 0.01546
E_B = 0.1424, E_B/E_F = 9.211
f_4 = -5.961
``` where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of the respective lenses.

37. An objective lens system for an endoscope according to claim 32, wherein said front lens unit has negative refractive power, said rear lens unit has positive refractive power and said stop located between said front and rear lens units in the vicinity of the front focal point.

38. An objective lens system for an endoscope according to claim 37 wherein said front lens unit comprises a negative meniscus lens component convex toward the object side, said rear lens unit comprises a positive meniscus lens component convex toward the image side, a positive lens component, a positive cemented doublet, and a positive lens component, each of said aspherical surfaces is expressed by the formula shown below when the optical axis is designated as the x axis and a straight line perpendicular to the optical axis and passing the intersecting point between said aspherical surface and optical axis is designated as the y axis and, moreover, each of said aspherical surfaces fulfills the condition shown below:

$$x = \frac{Cy^2}{1 + \sqrt{1 - PC^2y^2}} + By^2 + Ey^4 + Fy^6 + Gy^8 + \ldots$$

$$|E| > 0.007/f^3$$

$$|f_{1D}| < 2.5f$$

$$< 1.8f$$

where, reference, symbol f represents the focal length of the lens system as a whole, reference symbol f, represents the focal length of said front lens unit, reference symbol D represents the distance form the rearmost surface of said front lens unit to the foremost surface of said rear lens unit, reference symbol C represents the inverse number of the radius of curvature of the aspherical surface which is in contact with said aspherical surface on the optical axis, reference symbol P represents a parameter representing the shape of said aspherical surface, and reference symbols B, E, F, G, . . . respectively represent the aspherical surface coefficients of the second power, fourth power, sixth power, eighth power and so on.

39. An objective lens system for an endoscope according to claim 37 wherein said front lens unit comprises a negative meniscus lens component convex toward the object side, said rear lens unit comprises a positive lens component, and a cemented doublet, each of said aspherical surfaces is expressed by the formula shown below when the optical axis is designated as the x axis and a straight line perpendicular to the optical axis and passing the intersecting point between said aspherical surface and optical axis is designated as the y axis and, moreover, each of said aspherical surfaces fulfills the condition shown below:

$$x = \frac{Cy^2}{1 + \sqrt{1 - PC^2y^2}} + By^2 + Ey^4 + Fy^6 + Gy^8 + \ldots$$

$$|E| > 0.001/f^3$$

$$|f_{1D}| > 1.8f$$

$$> 1.5f$$

where, reference symbol f represents the focal length of the lens system as a whole, reference symbol f, represents the focal length of said front lens unit, reference symbol D represents the distance from the rearmost surface of said front lens unit to the foremost surface of said rear lens unit, reference symbol O represents the inverse number of the radius of curvature of the aspherical surface which is in contact with said aspherical surface on the optical axis, reference symbol P represents a parameter representing the shape of said aspherical surface, and reference symbols B, E, F, G, . . . respectively represent the aspherical surface coefficients of the second power, fourth power, sixth power, eighth power and so on.

40. An objective lens system for an endoscope according to claim 37 wherein said front lens unit comprises two negative lens components each having a concave surface on the image side, said rear lens unit comprises a positive lens component, a positive lens component, a positive cemented doublet, and a positive lens component having a convex surface on the object side, each of said aspherical surfaces is expressed by the formula shown below when the optical axis is designated as the x axis and a straight line perpendicular to the optical axis and passing the intersecting point between said aspherical surface and optical axis is designated as the y axis and, moreover, each of said aspherical surfaces fulfills the conditions shown below:

$$x = \frac{Cy^2}{1 + \sqrt{1 - PC^2y^2}} + By^2 + Ey^4 + Fy^6 + Gy^8 + \ldots$$

$$|f_F| < \cdot 1.8f$$

$$|E| < 0.001/f^3$$

where, reference symbol $f_F$ represents the focal length of said front lens group, reference symbol f represents the focal length of the lens system as a whole, reference symbol c represents the inverse number of the radius of curvature of the aspherical surface which is in contact with said aspherical surface on the optical axis, reference symbol P represents a parameter repesenting the shape of said aspherical surface, and reference symbols B, E, F, G, . . . respectively represent the aspherical surface coefficients of the second power, fourth power, sixth power eighth power and so on.

41. An objective lens system for an endoscope comprising a front lens unit, a rear lens unit, and a stop located between said front and rear lens units, said front lens unit comprising a negative lens component concave toward the image side arranged so that the surface on the image side thereof is formed as an aspherical surface having portions whose curvature is made gradually weaker as they are farther from the optical axis, and said rear lens unit comprising a plurality of lens component including a positive cemented doublet one of said lens components being arranged so that the surface on the image side thereof is formed as an aspherical surface having portions whose curvature is made gradually stronger as they are farther from the optical axis, the air space between the surface on the extreme image side of said front lens unit and said stop being constant.

42. An objective lens system for an endoscope according to claim 41 fulfilling the following conditions:

$$A_F \cdot A_R < 0$$

$$0.01 < |A_F/A_R| < 10$$

where, reference symbol $A_F$ represents the sum of coefficients of astigmatism of said aspherical surfaces provided in said front lens unit, and reference symbol $A_R$ represents the sum of coefficients of astigmatism of said aspherical surfaces provided in said rear lens unit. optical axis, reference symbol P represents a parameter representing the shape of said aspherical surface, and reference symbols B, E, F, G, ... respectively represent the aspherical surface coefficients of the second power, fourth power, sixth power eighth power and so on.

43. An objective lens system for an endoscope according to claim 42, wherein a meniscus lens component concave toward the image side is arranged on the extreme object side of said front lens unit, a meniscus lens component concave toward the object side is arranged on the extreme image side of said rear lens unit, a positive lens component is arranged on the extreme image side of said front lens unit, a positive lens component is arranged on the extreme image side of said front lens unit, a positive lens component is arranged on the extreme object side of said rear lens unit, and a stop is arranged between said positive lenses arranged in front lens unit and rear lens unit.

44. An objective lens system for an endoscope according to claim 43 wherein said front lens unit comprises a negative lens component having a concave surface on the image side, and a positive cemented doublet, said rear lens group comprises a positive cemented doublet, and a meniscus lens component convex toward the image side, each of said aspherical surfaces is expressed by the formula shown below when the optical axis is designated as the x axis and a straight line perpendicular to the optical axis and passing the intersecting point between said aspherical surface and optical axis is designated as the y axis and, moreover, each of said aspherical surfaces fulfills the condition shown below:

$$x = \frac{Cy^2}{1 + \sqrt{1 - PC^2y^2}} + By^2 + Ey^4 + Fy^6 + Gy^8 + \ldots$$

$$|E| > 0.001/f^3$$

where, reference symbol f represents the focal length of the lens system as a whole, reference symbol c represents the inverse number of the radius of curvature of the spherical surface which is in contact with said aspherical surface on the optical axis, reference symbol P represents a parameter representing the shape of said aspherical surface, and reference symbols B, E, F, G, . . . respectively represent the aspherical surface coefficients of the second power, fourth power, sixth power, eighth power and so on.

45. An objective lens system for an endoscope according to claim 44 wherein the surface on the image side of said meniscus lens component in said rear lens unit is formed as an aspherical surface having portions whose curvature is made gradually stronger as they are farther from the optical axis.

46. An objective lens system for an endoscope according to claim 45 further fulfilling the following condition:

$$f_4 < -3f$$

where, reference symbol $f_4$ represents the focal length of said meniscus lens component constituting said rear lens unit.

47. An objective lens system for an endoscope according to claim 44 having the following numerical data:

| | | |
|---|---|---|
| $r_1 = -10.5764$ | | |
| $d_1 = 0.2644$ | $n_1 = 1.51633$ | $\nu_1 = 64.15$ |
| $r_2 = 0.8576$ (aspherical surface) | | |
| $d_2 = 1.4849$ | | |
| $r_3 = 4.0495$ | | |
| $d_3 = 0.5887$ | $n_2 = 1.5927$ | $\nu_2 = 35.29$ |
| $r_4 = -3.11$ | | |
| $d_4 = 0.015$ | | |
| $r_4 = \infty$ (stop) | | |
| $d_5 = 0.0017$ | | |
| $r_6 = 2.5394$ | | |
| $d_6 = 0.5817$ | $n_3 = 1.62041$ | $\nu_3 = 60.27$ |
| $r_7 = -0.783$ | | |
| $d_7 = 0.2115$ | $n_4 = 1.80518$ | $\nu_4 = 25.43$ |
| $r_8 = -1.4395$ | | |
| $d_8 = 0.7633$ | | |
| $r_9 = -2.2144$ | | |
| $d_9 = 0.2712$ | $n_5 = 1.84666$ | $\nu_5 = 23.88$ |
| $r_{10} = -3.4775$ (aspherical surface) | | |
| $f = 1, 2\omega = 105.97°$ | | |
| aspherical surface coefficient and 2nd surface | | |
| $P = 1, E = -0.6762 \times 10^{-1}$ | | |
| $F = -0.98299 \times 10^{-1}$ | | |
| aspherical surface coefficient of 10th surface | | |
| $P = 1, E = 0.28784$ | | |
| $F = -0.63525 \times 10^{-1}$ | | |
| $A_F = -0.00404, A_F = 0.01655$ | | |
| $A_F/A_F = -0.2441, E_F = -0.06762$ | | |
| $E_B = 0.28784, |E_B/E_F| = 4.257$ | | |
| $f_4 = -7.987$ | | | where, reference symbols $r_1, r_2, \ldots$ respectively represent radii of curvature of respective lens surfaces, reference symbols $d_1, d_2, \ldots$ respectively represent thickness of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

48. An objective lens system for an endoscope comprising a front lens unit, a rear lens unit, and a stop located between said front and rear lens units, said front lens unit comprising a negative meniscus lens component convex toward the object side arranged that the surface of the image side thereof is formed as an aspherical surface having portions whose curvature is made gradually weaker as they are farther from the optical axis, and said rear lens unit comprising plurality of lens components including a positive cemented doublet one of said lens components being arranged so that the surface on the object side thereof is formed as an aspherical surface having portions whose curvature is made gradually weaker as they are farther from the optical axis, the air space between the surface on the extreme image side of said front lens unit and said stop being constant.

49. An objective lens system for an endoscope according to claim 48 fulfilling the following conditions:

$$A_F \cdot A_R < 0$$

$$0.01 < |A_F/A_R| < 10$$

where, reference symbol $A_F$ represents the sum of coefficients of astigmatism of said aspherical surfaces provided in said front lens unit, and reference symbol $A_R$ represents the sum of coefficients of astigmatism of said aspherical surfaces provided in said rear lens unit.

50. An objective lens system for an endoscope according to claim 49, wherein said front lens unit has negative refractive power, said rear lens unit has positive refractive power and said stop located between said front and rear lens units in the vicinity of the front focal point.

51. An objective lens system for an endoscope according to claim 50 wherein said rear lens unit comprises a positive meniscus lens component convex toward the image side, a positive lens component, a positive cemented doublet, and a positive lens component, each of said aspherical surfaces is expressed by the formula shown below when the optical axis is designated as the x axis and a straight line perpendicular to the optical axis and passing the intersecting point between said aspherical surface and optical axis is designated as the y axis and, moreover, each of said aspherical surfaces fulfills the condition shown below:

$$x = \frac{Cy^2}{1 + \sqrt{1 - PC^2 y^2}} + By^2 + Ey^4 + Fy^6 + Gy^8 + \ldots$$

$$|E| > 0.007/f^3$$

$$|f_{1D}| < 2.5f$$

$$< 1.8f$$

where, reference symbol f represents the focal length of the lens system as a whole, reference symbol $f_1$ represents the focal length of said front lens unit, reference symbol D represents the distance from the rearmost surface of said front lens unit to the foremost surface of said rear lens unit reference symbol C represents the inverse number of the radius of curvature of the aspherical surface which is in contact with said aspherical surface on the optical axis, reference symbol P represents a parameter representing the shape of said aspherical surface, and reference symbols B, E, F, G, ... respectively represent the aspherical surface coefficients of the second power, fourth power, sixth power, eighth power and so on.

52. An objective lens system for an endoscope according to claim 50 wherein said rear lens unit comprises a positive lens component, and a cemented doublet, each of said aspherical surfaces is expressed by the formula shown below when the optical axis is designated as the x axis and a straight line perpendicular to the optical axis and passing the intersecting point between said aspherical surface and optical axis is designated as the y axis and, moreover, each of said aspherical surfaces fulfills the conditions shown below:

$$x = \frac{Cy^2}{1 + \sqrt{1 - PC^2 y^2}} + By^2 + Ey^4 + Fy^6 + Gy^8 + \ldots$$

$$|E| > 0.001/f^3$$

where, reference symbol f represents the focal length of the lens system as a whole, reference symbol O represents the inverse number of the radius of curvature of the spherical surface which is in contact with said aspherical surface on the optical axis, reference symbol P represents a parameter representing the shape of said aspherical surface, and reference symbols B, E, F, G, ... respectively represent the aspherical surface coefficients of the second power, fourth power, sixth power, eighth power and so on.

53. An objective lens system for an endoscope according to claim 52 further fulfilling the following conditions:

$$|f_1| > 1.8f$$

$$D > 1.5f$$

where, reference symbol $f_1$ represents the focal length of said front lens unit, and reference symbol D represents the distance from the rearmost surface of said front lens unit to the foremost surface of said rear lens unit.

54. An objective lens system for an endoscope according to claim 53 wherein the surface on the object side of said positive cemented doublet constituting said rear lens unit is formed as an aspherical surface having portions whose curvature is made gradually weaker as they are farther from the optical axis.

55. An objective lens system for an endoscope according to claim 54 having the following numerical data:

```
r1 = 4.1406
d1 = 0.8005         n1 = 1.88300        ν1 = 40.76
r2 = 1.1345 (aspherical surface)
d2 = 4.1302
r3 = ∞ (stop)
d3 = 0.3680
r4 = 6.9159
d4 = 0.8469         n2 = 1.69680        ν2 = 55.52
r5 = −4.1736
d5 = 1.7075
r6 = 2.8187 (aspherical surface)
d6 = 1.9723         n3 = 1.64000        ν3 = 60.09
r7 = −1.4348
d7 = 0.5801         n4 = 1.84666        ν4 = 23.88
r8 = −4.0238
     f = 1, 2ω = 66.482°
     aspherical surface coefficient of 2nd surface
     P = 1, E = −0.92345 × 10⁻¹
     F = 0.33387 × 10⁻¹
     aspherical surface coefficient of 6th surface
     P = 1, E = −0.79246 × 10⁻²
     F = 0.36822 × 10⁻²
     A_F = −0.01433, A_R = 0.00246
     A_F/A_R = −5.8252
     f1 = −2.002, D1 = 4.498
``` where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

56. An objective lens system for an endoscope according to claim 50 wherein said front lens unit comprises two negative lens components each having a concave surface on the image side, said rear lens unit comprises a positive lens component, a positive lens component, a positive cemented doublet, and a positive lens component having a convex surface on the object side, each of said aspherical surfaces is expressed by the formula shown below when the optical axis is designated as the x axis and a straight line perpendicular to the optical axis and passing the intersecting point between said aspherical surface and optical axis is designated as the y axis and, moreover, each of said aspherical surfaces fulfills the conditions shown below:

$$x = \frac{Cy^2}{1 + \sqrt{1 - PC^2y^2}} + By^2 + Ey^4 + Fy^6 + Gy^8 + \ldots$$

$$|f_F| < \cdot 1.8f$$

$$|E| < 0.001/f^3$$

where, reference symbol $f_F$ represents the focal length of said front lens group, reference symbol f represents the focal length of the lens system as a whole, reference symbol C represents the inverse number of the radius of curvature of the spherical surface which is in contact with said aspherical surface on the optical axis, reference symbol P represents a parameter representing the shape of said aspherical surface, and reference symbols B, E, F, G, . . . respectively represent the aspherical surface coefficients of the second power, fourth power, sixth power, eighth power and so on.

57. An objective lens system for an endoscope according to claim 56 wherein the surface on the object side of said rearmost lens component in said rear lens unit is formed as an aspherical surface having portions whose curvature is made gradually weaker as they are farther from the optical axis.

58. An objective lens system for an endoscope according to claim 57 having the following numerical data:

| | | |
|---|---|---|
| $r_1 = 13.333$ | | |
| $d_1 = 0.7333$ | $n_1 = 1.49109$ | $\nu_1 = 57.00$ |
| $r_2 = 3.6471$ (aspherical surface) | | |
| $d_2 = 1.0730$ | | |
| $r_3 = 2240.3652$ | | |
| $d_3 = 2.1988$ | $n_2 = 1.78800$ | $\nu_2 = 47.43$ |
| $r_4 = 1.2225$ | | |
| $d_4 = 1.0494$ | | |
| $r_5 = \infty$ (stop) | | |
| $d_5 = 0.1241$ | | |
| $r_6 = -77.6317$ | | |
| $d_6 = 1.2380$ | $n_3 = 1.58913$ | $\nu_3 = 60.97$ |
| $r_7 = -1.9899$ | | |
| $d_7 = 0.7377$ | | |
| $r_8 = -6.0607$ | | |
| $d_8 = 1.3244$ | $n_4 = 1.58913$ | $\nu_4 = 60.97$ |
| $r_9 = -2.7972$ | | |
| $d_9 = 0.1333$ | | |
| $r_{10} = 4.3283$ | | |
| $d_{10} = 2.1067$ | $n_5 = 1.61800$ | $\nu_5 = 63.38$ |
| $r_{11} = -2.2200$ | | |
| $d_{11} = 0.4667$ | $n_6 = 1.84666$ | $\nu_6 = 23.90$ |
| $r_{12} = -16.4147$ | | |
| $d_{12} = 0.9325$ | | |
| $r_{13} = 2.0725$ (aspherical surface) | | |
| $d_{13} = 1.9851$ | $n_7 = 1.49109$ | $\nu_7 = 57.00$ |
| $r_{14} = \infty$ | | |

$f = 1, 2\omega = 115.9°$
aspherical surface coefficient of 2nd surface
$P = 1, E = -0.11242 \times 10^{-1}, F = 0$
aspherical surface coefficient of 13th surface
$P = 1, E = -0.54135 \times 10^{-1}, F = 0$
$A_F = -0.01753, A_R = 0.05767$ $A_F/A_R = -0.30397, f_F = -1.151$ where, reference symbols $r_1$, $r_2$, . . . respectively represent radii of curvature of respective lens surfaces, reference symbols $d_1$, $d_2$, . . . respectively represent thicknesses of respective lenses and airspaces between respective lenses, reference symbols $n_1$, $n_2$, . . . respectively represent refractive indices of respective lenses, and reference symbols $\nu_1$, $\nu_2$, . . . respectively represent Abbe's numbers of respective lenses.

59. An objective lens system for an endoscope according to claim 50 wherein a meniscus lens component concave toward the image side is arranged on the extreme object side of said front lens unit, a meniscus lens component concave toward the object side is arranged on the extreme image side of said rear unit, a positive lens component is arranged on the extreme image side of said front lens unit, a positive lens component is arranged on the extreme object side of said rear lens unit, and a stop is arranged between said positive lenses arranged in front lens unit and rear lens unit.

60. An objective lens system for an endoscope according to claim 59 wherein said front lens unit comprises a negative lens component having a concave surface on the image side, and a positive cemented doublet, said rear lens group comprises a positive cemented doublet, and a meniscus lens component convex toward the image side, each of said aspherical surfaces is expressed by the formula shown below when the optical axis is designated as the x axis and a straight line perpendicular to the optical axis and passing the intersecting point between said aspherical surface and optical axis is designatedas the y axis and, moveover, each of said aspherical surfaces fulfills the condition shown below:

$$x = \frac{Cy^2}{1 + \sqrt{1 - PC^2y^2}} + By^2 + Ey^4 + Fy^6 + Gy^8 + \ldots$$

$$|E| > 0.001/f^3$$

where, reference symbol f represents the focal length of the lens system as a whole, reference symbol C represents the inverse number of the radius of curvature of the spherical surface which is in contact with said aspherical surface on the optical axis, reference symbol P represents a parameter representing the shape of said aspherical surface, and reference symbols B, E, F, G, . . . respectively represent the aspherical surface coefficients of the second power, fourth power, sixth power, eighth power and so on.

61. An objective lens system for an endoscope comprising a front lens unit, a rear lens unit, and a stop located between said front and rear lens units, said front lens unit comprising a plane-parallel transparent plate on the object side of which a portion is provided at a distance from the optical axis which is aspherical in shape, the curvature of which is made gradually stronger as the distance increases from the optical axis, and said rear lens unit comprising two positive lens components arranged so that the lens surfaces facing each other are convex and the surface on the object side of the positive lens component on the image side thereof is formed as an aspherical surface having portions whose curvature is made gradually weaker as they are farther from the optical axis.

62. An objective lens system for an endoscope according to claim 61 wherein said front lens unit comprises a plane-parallel transparent plate on the object side of which is provided with a portion at a distance from the optical axis which is aspherical, said rear lens unit comprising a positive lens cemented on to the image side of said plane-parallel transparent plate, and a positive lens component having an aspherical surface on the object side, each of said aspherical surfaces being expressed by the formula shown below when the optical axis is designated as the x axis and a straight line perpendicular to the optical axis and passing the intersecting point between said aspherical surface and the optical axis is designated as the y axis and, moreover, each of said aspherical surfaces fulfills the condition shown below:

$$x = \frac{Cy^2}{1 + \sqrt{1 - PC^2 y^2}} + By^2 + Ey^4 + Fy^6 + Gy^8 + \cdots$$

$$|E| \& 0.01/f^3$$

where, reference symbol f represents the focal length of the lens system as a whole, reference symbol C represents the inverse number of the radius of curvature of the spherical surface which is in contact with said aspherical surface on the optical axis, reference symbol P represents a parameter representing the shape of said aspherical surface, the reference symbols B, E, F, G, ... respectively represent the aspherical surface coefficients of the second power, fourth power, sixth power, eighth power and so on.

63. An objective lens system for an endoscope according to claim 62 having the following numerical data:

```
r1 = ∞           (aspherical surface)
d1 = 0.5725      n1 = 1.51633         ν1 = 64.15
r2 = ∞ (stop)
d2 = 1.3991      n2 = 1.80610         ν2 = 40.95
r3 = -1.2000
d3 = 0.5436
r4 = 1.5780      (aspherical surface)
d4 = 1.2126      n3 = 1.80610         ν3 = 40.95
r5 = ∞
f = 1, 2ω = 81.502°
aspherical surface coefficient of 1st surface
P = 1, E = 0.12374, F = 0
aspherical surface coefficient of 4th surface
P = 1, E = -0.87329 × 10⁻¹
F = -0.18044 × 10⁻¹
A_F = -0.00267, A_R = 0.01139
A_F/A_R = -0.23442
``` where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of the respective lenses.

64. An objective lens system for an endoscope comprising a front lens unit, a rear lens unit, and a stop located between said front and rear lens units, and front lens unit comprising a negative lens component concave toward the image side and at least one lens surface of said front lens unit being formed as an aspherical surface having portions whose curvature is made gradually stronger as they are farther from the optical axis, and said rear lens unit comprising a plurality of lens components including a positive cemented doublet, one of said lens components being arranged so that the surface on the object side thereof is formed as an aspherical surface having portions whose curvature is made gradually weaker as they are farther from the optical axis, the air space between the surface on the extreme image side of said front lens unit and said stop being constant.

65. An objective lens system for an endoscope according to claim 64, wherein said negative lens component of said front lens unit is arranged that the surface on the object side thereof is formed as an aspherical surface having portions whose curvature is made gradually stronger as they are farther from the optical axis.

66. An objective lens system for an endoscope comprising a front lens unit, a rear lens unit, and a stop located between said front and rear lens units, said front lens unit comprising a negative lens component concave toward the image side and at least one lens surface of said front lens unit being formed as an aspherical surface having portions whose curvature is made gradually stronger as they are farther from the optical axis, and said rear lens unit comprising a plurality of lens components including a positive cemented doublet, one of said lens components being arranged so that the surface on the image side thereof is formed as an aspherical surface having portions whose curvature is made gradually stronger as they are farther from the optical axis, the air space between the surface on the extreme image side of said front lens unit and said stop being constant.

67. An objective lens system for an endoscope comprising a front lens unit, a rear lens unit, and a stop located between said front and rear lens units, said front lens unit comprising a negative lens component concave toward the image side and at least one lens surface of said front lens unit being formed as an aspherical surface having portions whose curvature is made gradually weaker as they are farther from the optical axis, and said rear lens unit comprising a plurality of lens components including a positive cemented doublet, one of said lens components being arranged so that the surface on the image side thereof is formed as an aspherical surface having portions whose curvature is made gradually stronger as they are farther from the optical axis, the air space between the surface on the extreme image side of said front lens unit and said stop being constant.

68. An objective lens system for an endoscope comprising a front lens unit, a rear lens unit, and a stop located between said front and rear lens units, said front lens unit comprising a negative lens components concave toward the image side and at least one lens surface of said front lens unit being formed as an aspherical surface having portions whose curvature is made gradually weaker as they are farther from the optical axis, and said rear lens unit comprising plurality of lens components including a positive cemented doublet, one of said lens components being arranged so that the surface on the object side thereof is formed as an aspherical surface having portions whose curvature is made gradually weaker as they are farther from the optical axis, the air space between the surface on the extreme image side of said front lens unit and said stop being constant.

69. An objective lens system for an endoscope according to claim 68, wherein said negative lens component of said front lens unit is arranged that the surface of the image side thereof is formed as an aspherical surface having portions whose curvature is made gradually weaker as they are farther from the optical axis.

70. An objective lens system for an endoscope comprising a front lens unit, a rear lens unit, and a stop located between said front and rear lens units, said front lens unit comprising an optical element having an aspherical surface, the curvature of which is made gradually stronger as the distance increases from the optical axis, and said rear lens unit comprising two positive lens components arranged so that the lens surfaces facing each other are convex and at least one lens surface of said two positive lens components is formed as an aspherical surface having portions whose curvature is made gradually weaker as they are farther from the optical axis.

* * * * *